United States Patent
Ouellet et al.

(10) Patent No.: US 6,336,052 B1
(45) Date of Patent: Jan. 1, 2002

(54) DATA ACQUISTION IMAGE ANALYSIS IMAGE MANIPULATION INTERFACE

(75) Inventors: Jean-François Ouellet; Patrick Rannou, both of Montréal (CA)

(73) Assignee: Forensic Technology Wai Inc., Quebec (CA)

( * ) Notice: Subject to any disclaimer, the term of this patent is extended or adjusted under 35 U.S.C. 154(b) by 0 days.

(21) Appl. No.: 09/111,743

(22) Filed: Jul. 8, 1998

(51) Int. Cl.[7] .......................... G05B 15/00; G05B 11/00
(52) U.S. Cl. .............................. 700/83; 700/66; 700/85; 345/649; 345/654; 356/388
(58) Field of Search ................................ 700/57, 59, 61, 700/62, 65, 66, 77, 85, 83; 703/24, 21; 345/649, 654, 840, 632; 356/388, 392

(56) References Cited

U.S. PATENT DOCUMENTS

| | | | |
|---|---|---|---|
| 4,052,603 A | * 10/1977 | Karlson | 700/192 |
| 4,987,412 A | * 1/1991 | Vaitekunas et al. | 345/635 |
| 5,379,106 A | * 1/1995 | Baldur | 356/623 |
| 5,390,108 A | 2/1995 | Baldur et al. | |
| 5,392,388 A | * 2/1995 | Gibson | 345/837 |
| 5,428,367 A | 6/1995 | Mikan | 345/157 |
| 5,546,525 A | 8/1996 | Wolf et al. | 345/809 |
| 5,581,670 A | 12/1996 | Bier et al. | 345/856 |
| 5,592,195 A | * 1/1997 | Misono et al. | 345/860 |
| 5,594,471 A | 1/1997 | Deeran et al. | 345/173 |
| 5,602,997 A | 2/1997 | Carpenter et al. | 345/764 |
| 5,617,114 A | 4/1997 | Bier et al. | 345/634 |
| 5,633,717 A | 5/1997 | Baldur | |
| 5,654,801 A | 8/1997 | Baldur | |
| 5,659,489 A | 8/1997 | Baldur | |
| 5,659,693 A | 8/1997 | Hansen et al. | 345/779 |
| 5,808,613 A | * 9/1998 | Marrin et al. | 345/850 |
| 5,894,294 A | * 4/1999 | Morita | 345/157 |

* cited by examiner

Primary Examiner—William Grant
Assistant Examiner—Paul Rodriguez
(74) Attorney, Agent, or Firm—Michael D. Bednarek; Shaw Pittman LLP

(57) ABSTRACT

An interface apparatus for use with a computer system. The apparatus in the preferred embodiment having three concentric annular rings. The outer most of which is a solid ring, the two inner rings each being segmented into for equal arcs, which arcs form four pairs of two buttons each. The interface also has at its center two buttons. The interface is used to position an object for imaging and also to manipulate and position the image of an object for comparison and analysis. The two center buttons and the outside annular ring are used to generate signals to rotate an object or the image of the object in a common reference frame. The four pairs of arcs of the two inner concentric rings are used to generate signals for translational motion of the object or the image of the object. The four pairs of arcs being positioned to move the object or the image of the object in one of four perpendicular directions within the common reference frame. In a sub-operating state the outside periphery of the outer most solid ring can be made to represent the contours of the surface of an object and also to indicate which portions of the surface of that object have been imaged.

31 Claims, 13 Drawing Sheets

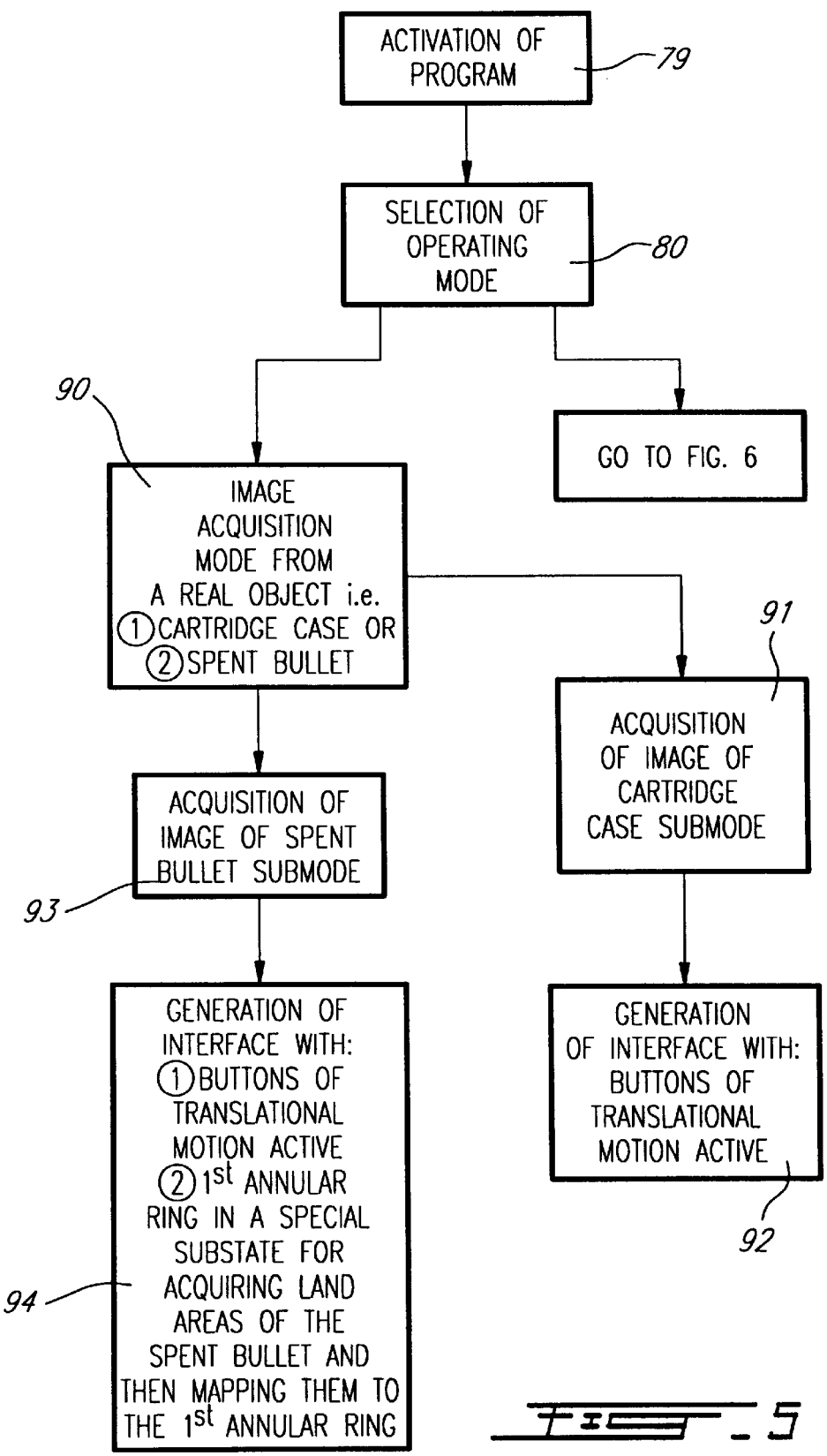

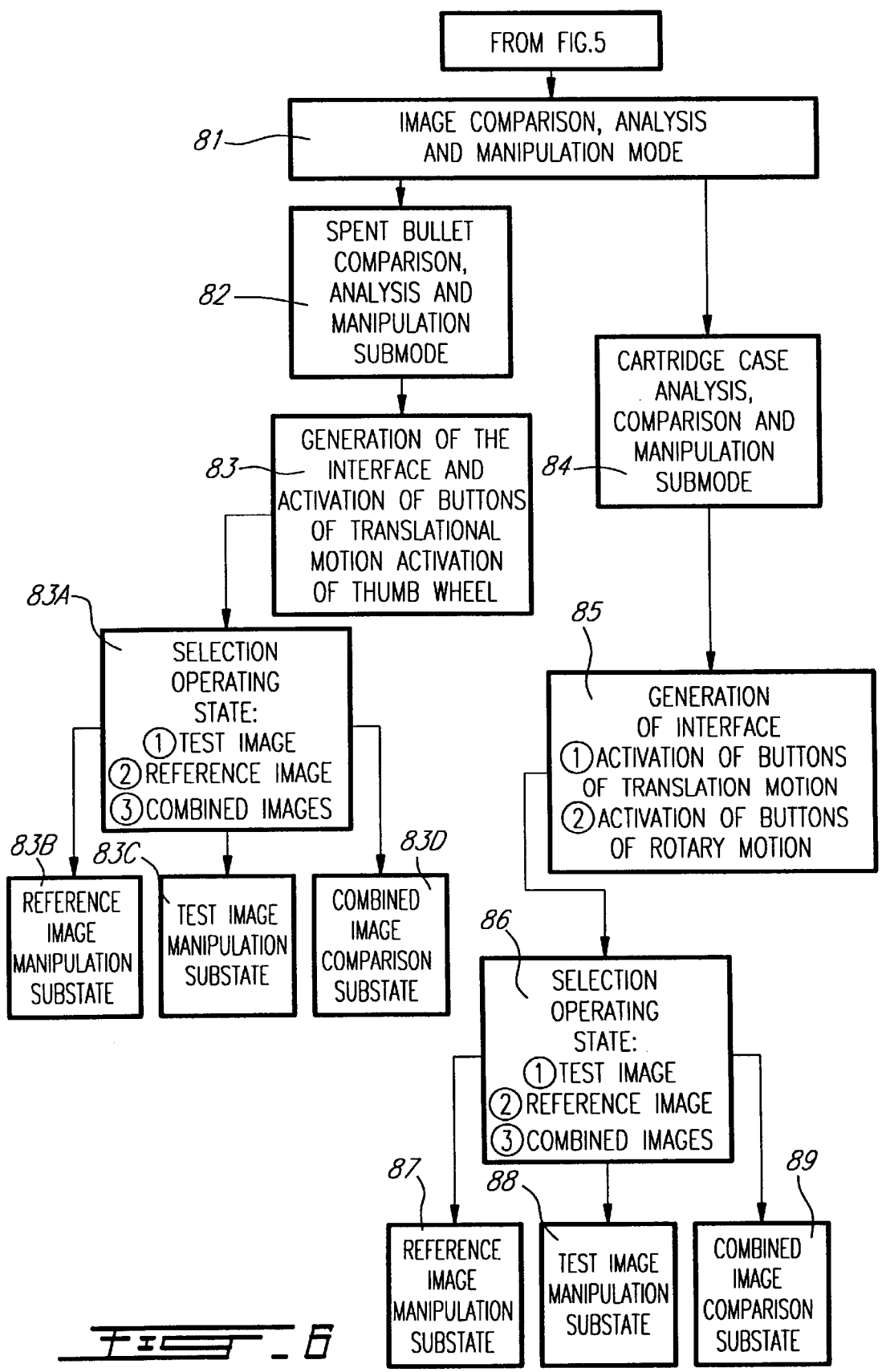

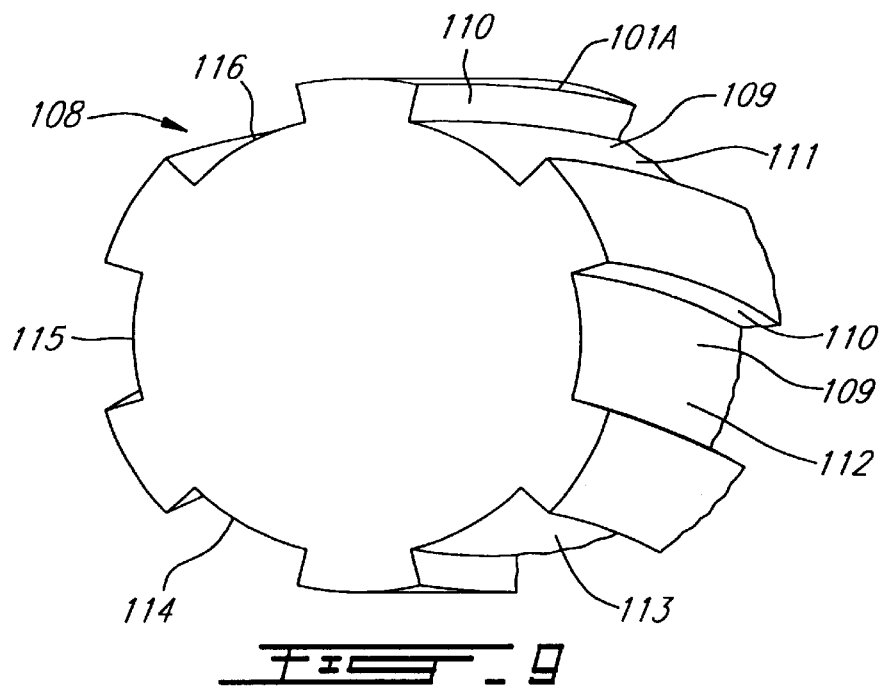
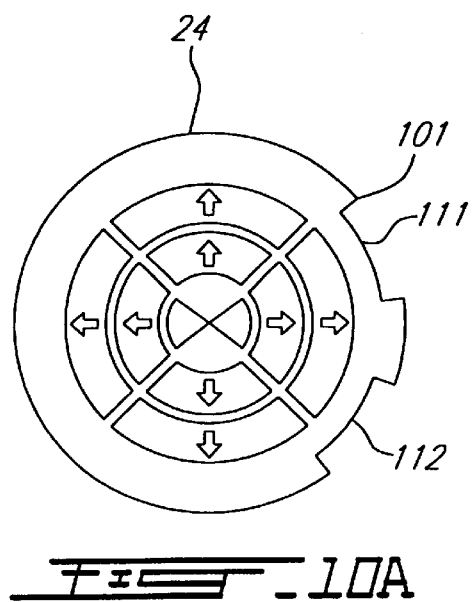
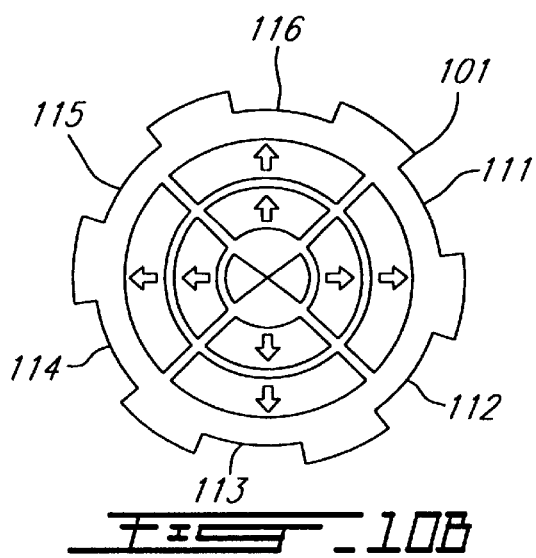
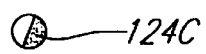

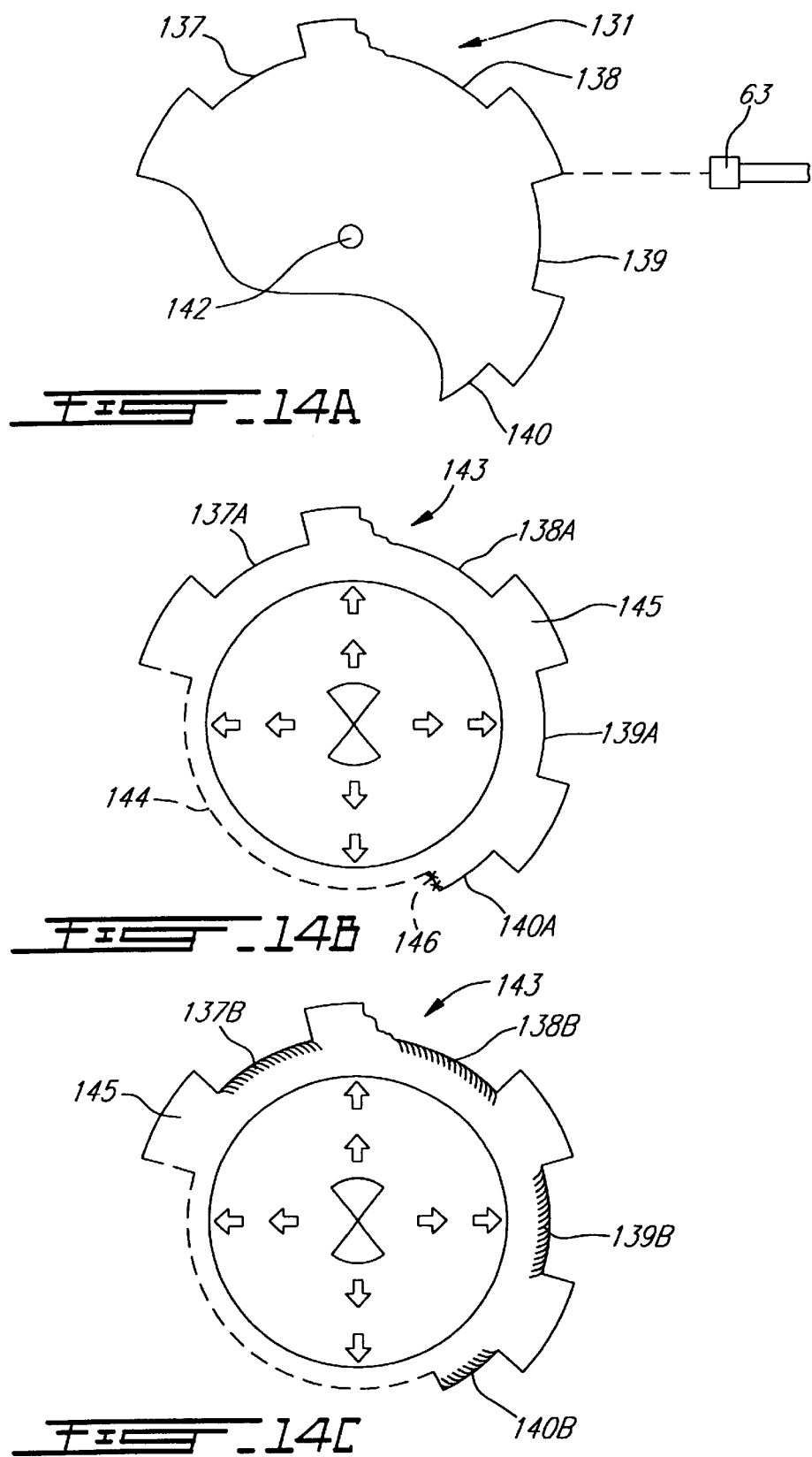

DATA ACQUISTION IMAGE ANALYSIS IMAGE MANIPULATION INTERFACE

FIELD OF THE INVENTION

The invention relates to interfaces for use on a visual display of a computer system to allow an operator to interact with the computer system. More specifically, it relates to an improved user friendly interface for use in an interactive environment which involves the positioning of an object for imaging and also for analysis, comparison and manipulation of the image of the object.

BACKGROUND OF THE INVENTION

The first personal computers had very crude and hard to use interfaces which in some instances amounted to knowing special codes which one then typed into the computer. Since then, one of the driving forces in the development and improvement of computers has been the improvement of the user interface. The trend has been to develop user friendly, intuitive and generally graphical visually based interfaces. In fact, the success or failure of some products, in particular, software products, has been their user interfaces and how easy they made the product to master and use. However, such a plethora of interfaces now exist that the user now has to often master a new interface for each new product or application encountered and used.

Thus, there is a continuing need to improve interfaces and make them easier and more intuitive in their operation. Additionally, a significant need exists to make interfaces with enough flexibility and capacity to allow them to function with a fairly wide variety of applications but still retain their flexibility, intuitive feel and usefulness. One significant area in which this need exists in is image acquisition and image analysis, comparison and manipulation.

SUMMARY OF THE INVENTION

It is an object of the present invention to provide a user friendly generally intuitive interface for use with a computer system which has sufficient flexibility and adaptability to be used in a variety of different applications.

The object of the present invention is achieved by providing an interface apparatus for manipulating a workpiece positionable by movement means. The interface apparatus has a first annular control means responsive to operator input for generating a rotational control signal for rotating said workpiece within a common reference frame and a second annular control means responsive to operator input for generating a translational motion control signal for movement of said workpiece within the common reference frame. The apparatus also has a command and control mechanism to generate the specified control signals upon operator input, transmit the control signals to said movement means and initiate activity specified by the operator input. The apparatus in this aspect of the invention allows the operator to position the workpiece for at least one of the following imaging, analysis and comparison.

In another aspect of this invention, the interface apparatus has a third annular control means for generating a translational motion control signal, for movement of the workpiece within the reference frame, wherein the control signal generated by the second annular control means moves the workpiece in small increments and the signal generated by the third annular control means moves the workpiece in large increments.

In another aspect of this invention the two annular control means of the interface apparatus are concentric so that they share a common center. The interface apparatus has at the common center of the first and second concentric annular control means at least two activable buttons, the first button when activated rotates the work piece in a clockwise direction and the second button when activated rotates the work piece in a counterclockwise direction.

In another aspect of this invention the second annular control means of the interface apparatus is segmented into four equal arcs, with each arc forming a separate button for directed motion, which on individual activation of each button generates a control signal for movement of the workpiece on a vector in a direction which is radially away from a common center of the arcs and normal to a center of a peripheral outside edge of the arc so activated, the arcs being so positioned that the direction of a vector of any one arc is perpendicular to the direction of vectors of the two adjacent arcs when each is activated by operator input, and 180 degrees from the direction of a vector of an arc on the opposite side of the common center of the arcs when activated by operator input. The interface apparatus includes a third annular ring, also segmented into four equal arcs, each arc so formed being paired with an arc of the second annular ring so that the paired arcs form two buttons for movement of the workpiece along a vector in the same direction, one of the arcs of each pair providing for small incremental movements of the workpiece and the other arc of each pair providing for large incremental movements of the workpiece.

In yet another aspect of this invention the control signal generated by operator input at a selected spot on the second annular control means moves the workpiece within the common reference frame in a direction of a vector radially away from a common center of the second annular control means and normal to a tangent line formed at the closest point on an outside periphery of the annular control means to the selected spot on the second annular control means activated by operator input In yet another aspect of the invention the command and control mechanism is a programmable computer with a visual display. The computer system of the invention being in functional communication with an imaging device and an object positioning device, the imaging device being placed in relation to the object positioning device such that upon operator input, applied through the interface, the computer system can generate the necessary control signal to position the object held by the object positioning device in a focal plane of the object imaging device so that the imaging device can focus on the object and transmit to the computer for display on the visual display the image of that object so obtained.

In yet another aspect of this invention the first annular control means can be switched between a first operational state wherein it rotates an object and a second operational state wherein contours of a surface of the object can be mapped to an outside periphery of the first annular control means so that a representation of the contours of the surface of the object appears on the outside periphery of the first annular control means. The second operation state maps those portions of the contours of the object which have been successfully imaged and stored in a memory by the computer system. The object imaged in the preferred embodiment generally being a spent bullet and the first annular control means of the interface apparatus in the second operational state displays on its outside periphery contours of land engraved areas of the bullet successfully imaged and stored by the computer in a memory.

In yet another aspect of this invention, the workpiece is an image of a reference object and an image of a test object and the computer system can then simultaneously, display on the visual display, an image of a test object and an image of a reference object and operator input applied through the interface can switch the computer system between three different image analysis states, a first state for manipulating the image of the test object, a second state for manipulating the image of the reference object and a third state for manipulating the combined images of the test object and the reference object. When the interface is in the third state, the image of the test object and the reference object are joined together on the visual display in an overlapping configuration with the visible portions of the image of the reference object and the image of the test object separated by a line of separation, the line of separation being manipulated by operator input means. Operator input to manipulate the line of separation, while the interface is in the third state, causes the line of separation to rotate about a central point, which as it rotates, it successively reveals different portions of the overlapped images of the test object and the image of the reference object so that the operator can compare and analyze them.

In yet another aspect of this invention, the first annular control means has an operator actionable marker, which masker, as the operator moves it around the first annular ring generates the signal which causes the workpiece to rotate in the same direction through the same angular distance as the marker is moved, by the operator, on the first annular control means.

In yet another aspect of this invention the operator activates the interface with a pointing device. The pointing device can be: a mouse, track ball, touch pad, light pen and PC styles. Alternatively, the operator can activate the various parts of the interface with a touch sensitive screen.

According to the invention, there is also provided a method for a computer system to manipulate objects and images which includes the steps of:

generating an actionable interface for a visual display with at least two annular control means: the first annular control means, when activated, generates a control signal of rotational motion which rotates a workpiece within a reference frame, the second annular control means, when activated, generates a control signal of translational motion which moves the workpiece within the reference frame;

moving a workpiece within the reference frame to a desired location in that reference frame, with the control signal of translational motion generated by activating the second annular control means;

rotating the workpiece within the reference frame to a desired angular orientation with the control signal of rotational motion generated by activating the first annular control means; and conducting at least one of the following imaging, analysis and comparison.

The method of the invention preferably includes one or more of the additional steps of generating the first and second annular control means such that they are concentric and thus share a common center. Generating a third annular control means which shares the common center with the first and second annular control means, wherein activation of the third annular control means generates a signal of translational motion which moves the workpiece in large increments and the signal of translational motion generated by activation of the second annular control means moves the work piece in small increments.

Another alternative aspect of the method of this invention involves generating a control signal by operator input at a selected spot on the second annular control means which moves the workpiece in the direction of a vector pointing radially away from a center of the second annular control means and normal to a line tangent to a point on an outside circumference of the second annular control means which point is the closest point on the outside periphery to the selected spot.

In yet another alternative aspect of the method of this invention the step of generating the interface includes segmenting the second annular control means into four equal arcs, with each arc forming a separate button for directed motion, which on individual activation of each button generates a control signal for movement of the workpiece on a vector in a direction which is radially away from a common center of the arcs, said vector being normal to the center of the peripheral outside edge of the arc so activated, the arcs being so positioned that the direction of the vector of any one arc being perpendicular to the direction of the vectors of the two adjacent arcs and 180 degrees from the direction of the vector of the arc on the opposite of the common center. This alternative aspect can include the additional step of generating a third concentric annular control means which shares the common center with the second annular control means, the third annular control means being segmented into four equal arcs, each arc so formed by the third annular control means being paired with an arc of the second annular control means so that the paired arcs form two buttons for movement of the workpiece along a vector in the same direction, one of the arcs of each pair providing for small incremental movements of the workpiece and the other arc of each pair providing for large incremental movements of the workpiece. The method of this invention can also include generating two buttons at the common center of the annular control means, one of said buttons upon operator activation rotates the workpiece in a clockwise direction and the other button on operator activation rotates the workpiece in a counterclockwise direction.

In yet another aspect of the method of this invention it can include switching between two operating modes, a first mode for image acquisition and second for image analysis, comparison and manipulation. The step of operating in the first operating mode comprises manipulating with the interface a workpiece which is both an object and an image of that object, the image of the object so manipulated appearing on the visual display. In the step of operating in the second operating mode the workpiece is an image of a reference object and an image of a test object and the step of operating in the second operating mode includes simultaneously displaying on the visual display the image of the test object and the image of the reference object, and a further step, switching the interface in the second operating mode between three different states, a first state for manipulating he image of the test object, a second state for manipulating the image of the reference object and a third state for manipulating a combined image of the test object and the reference object. The step of operating in the first operating mode can also include the step of selecting one of two different states to operate in: a first state for acquisition of an image of a cartridge case and a second state of the first operating mode for acquisition of images of the land engraved areas of a spent bullet The step of operating in the second state includes the step of mapping to the first annular control means a representation of each land engraved area successfully imaged.

In another aspect of the invention it provides a method of displaying contours of a surface of an object, the method comprising the steps of: providing an interface with a peripheral surface; obtaining positional information on contours of said surface of said object; and altering said interfaces peripheral surface to display said information on the contours of portions of said object.

In yet another aspect of this method the step of obtaining the information on the contours of said surface of said object comprises scanning the surface of said object and generating a mathematical function approximating said surface of said object.

In yet another aspect of this method the step of altering said interfaces peripheral surface comprises: altering the peripheral surface of said interface apparatus with the information from said mathematical function.

In yet another aspect of this method it includes the additional step of imaging selected portions of said surface of said object and indicating on the peripheral surface of said interface which portions of said surface of said object have been imaged.

BRIEF DESCRIPTION OF THE DRAWINGS

The invention will be better understood by an examination of the following description, together with the accompanying drawings, in which:

FIG. 1A depicts an object being manipulated by the present invention;

FIG. 5 is part of a flow chart of one system which incorporates the interface of the present invention;

FIG. 6 is the rest of flow chart of the system of FIG. 5 which incorporates the interface of the present invention;

FIG. 9 is a perspective view of a spent bullet;

FIG. 10A is a view of the interface of the present invention in one of its implementations;

FIG. 10B is another view of the interface of the present invention after completion of the implementation in 10A;

FIG. 11A depicts the window activity indicator when the window with the test image is active;

FIG. 11B depicts the window activity indicator when the window with the reference image is active;

FIG. 11C depicts the window activity indicator when both the reference image and the test image are combined in one window are overlapped with a line of reference indicating the boundaries between the images;

FIG. 14A is a view of an end of a spent bullet fragment;

FIG. 14B is an interface of the present invention with the scanned contour of the spent bullet fragment mapped to its first annular ring;

FIG. 14C is the interface of FIG. 14B with an indication of those areas successfully imaged;

DETAILED DESCRIPTION OF THE PREFERRED EMBODIMENTS

Overview of the Invention

Figure 1:
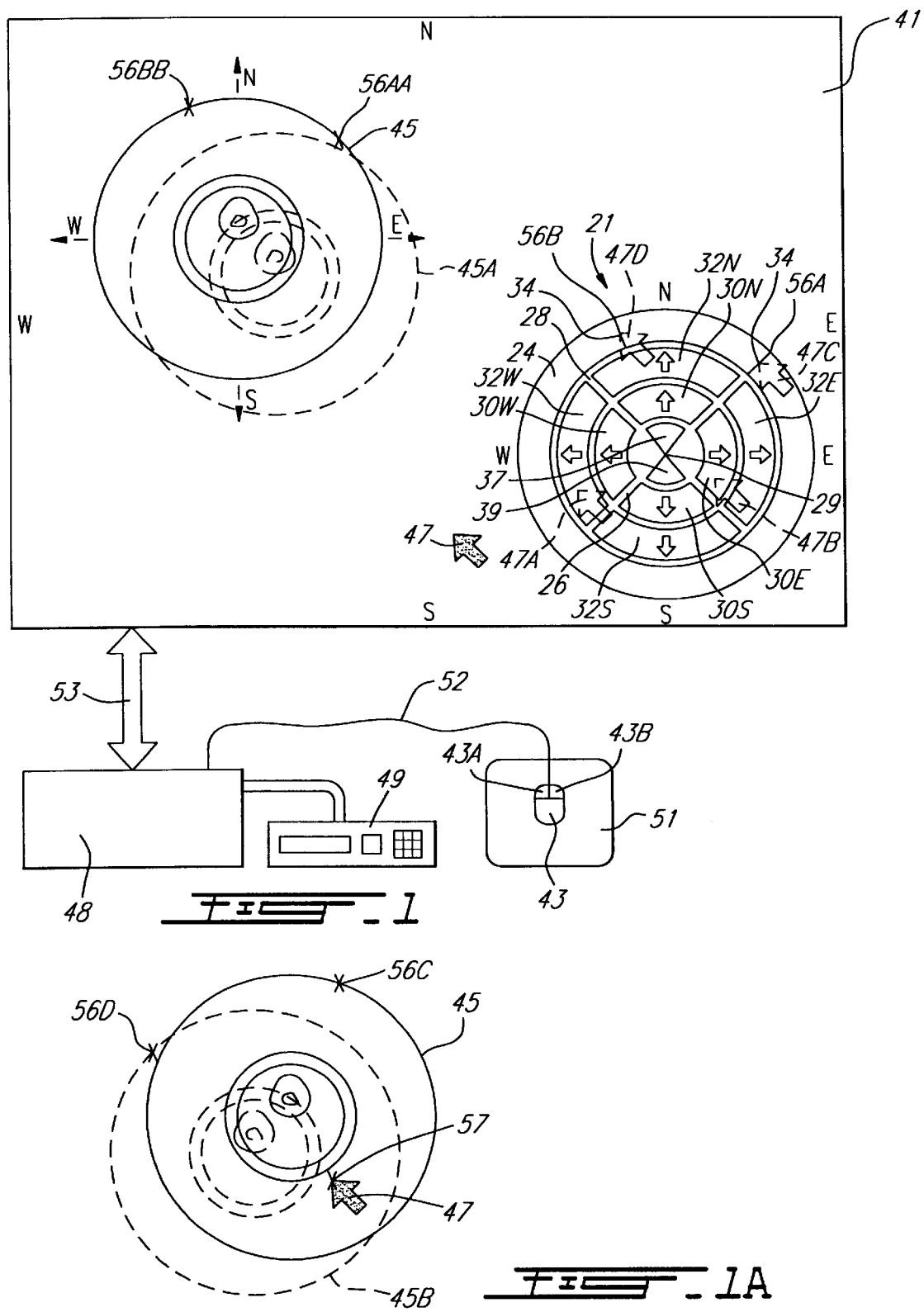
FIG. 1 is a schematic drawing of the essential features of the present invention.

The interface 21 of the present invention appears on visual display 41 in FIG. 1. Visual display 41 generally being a computer screen such as a CRT, liquid crystal display or any similar device which provides the user of a computer with a visual display. The appropriately configured software, which will be discussed below, would generate directional dial interface 21 on visual display 41 and allow the operator of the computer 48 to interact with the computer 48 in the manner which will shortly be described.

The computer system depicted in FIG. 1 includes a computer 48, connected by a video bus 53 to visual display 41. The computer in turn has a keyboard 49 connected to it as well as pointing device 43, in the example, a mouse, by cable 52. The computer system would be running the appropriate software which generates the image of the interface 21 among other things. In fact, as will be noted in more detail below, given the current state of development of software once the configuration and mode of the present invention is described a knowledgeable software writer could compose the necessary software in a variety of different ways to achieve the effect and purpose of the present invention.

The directional dial interface 21 in the preferred embodiment has three annular rings 24, 26 and 28 with a common center 29. The first annular ring 24, which is the outermost of the three, is an unbroken ring. The second annular ring 26 is the innermost one and in the preferred embodiment is sectioned into four separate buttons 30N, 30E, 30S, and 30W. The third annular ring 28 lies between the first ring 24 and the second ring 26 and like ring 26 in the preferred embodiment is sectioned into four separate buttons 32N, 32E, 32S, and 32W. The common center 29 has two triangular buttons 37 and 39.

Figure 3:
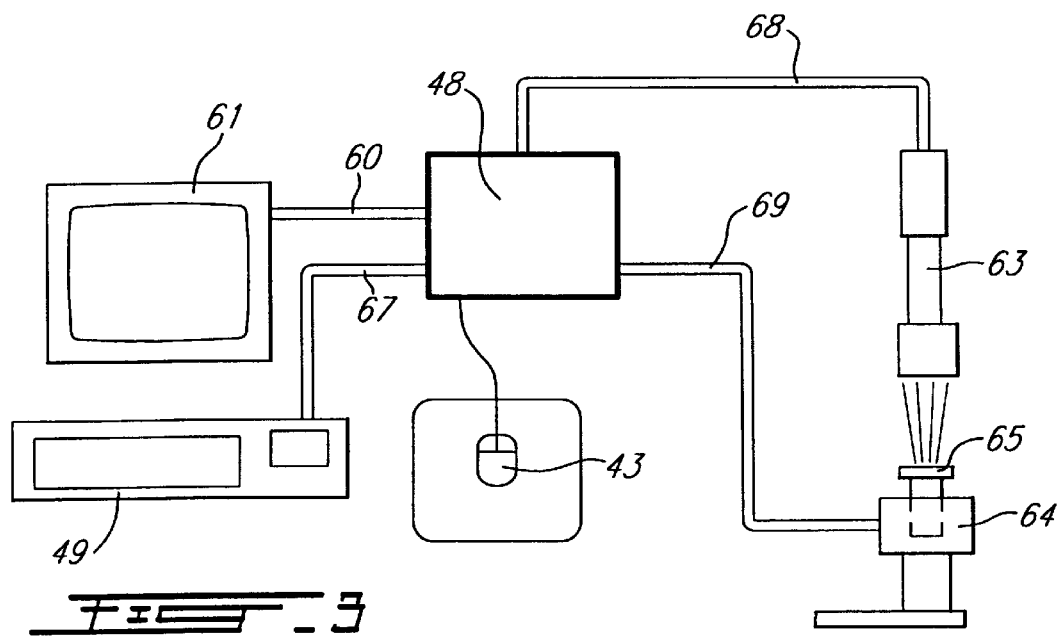
FIG. 3 provides a schematic of a system with which the screen display in FIG. 2 would be used.

All of the buttons of directional dial interface 21 have a specific general function which allow the computer operator to move and manipulate the spatial position of an image of an object in a specific frame of reference. This frame of reference is in fact the visual display 41 on which the image of the object appears. The image of an object 45 provides one example of an image which can be manipulated with the interface of the present invention. Although the screen itself is two dimensional, as is well known in the art, a visual display can depict an image of an object in three dimensions and the interface could be configured to handle such object manipulation. Additionally, although the operator may be manipulating an image of an object on the visual display, in actuality, the operator could be manipulating an image of an object previously taken and stored for later use or the image of an object being viewed in real time. If the operator is viewing an image of an object in real time (i.e. the operator views the image of an object as it is actually being taken) the system can be configured such that each manipulation of the image being viewed could result in a corresponding movement of the object. The object, being in another corresponding reference frame, where it is being viewed by an appropriate imaging device 63 FIG. 3. The other or secondary reference frame being the focal plane of the imaging device 63. The primary reference frame being the visual display. The imaging device 63 which is transmitting the image of the object so viewed to the computer 48 for imaging on the screen 61 could be any number of cameras or a charged coupled device (CCD) which are well known in the art. One such setup is depicted in FIG. 3 and will be discussed again below. Hereon in the term "workpiece" can refer to both the image of an object or the object itself when being imaged.

The buttons of directional dial interface 21 FIG. 1 in the preferred embodiment would be activated by the computer operator using a pointing device 43. Item 43 in FIG. 1 is a standard two button mouse. As is well known in the art, the mouse has at least one button. However, in most instances the mouse has two and sometimes three buttons. One of the buttons, generally the left button 43A, is the primary activating button. Mouse 43 has a corresponding cursor 47 generated on visual display 41 by the appropriate and commonly available software which is well known in the art. The operator moves the pointing device 43, about on a flat surface, in this case pad 51. Each move of the pointing device 43, as is well known by those who use them, results in a corresponding move of the pointing device cursor 47 on visual display 41. This allows the operator to position the pointing device cursor 47 at any position on visual display 41 in a few moves of the pointing device 43. For example, by making the appropriate moves of pointing device 43 on pad 51 the cursor 47 could be easily moved to position 47A, 47B, 47C or any other position on the visual display. When pointing device cursor 47, in visual display 41, is placed on one of the buttons of directional dial interface 21 and the appropriate button on the pointing device 43 is pushed, movement of the workpiece in this case image 45 is initiated. The actual direction of movement depends on which button of directional dial interface 21 is activated by the pointing device 43. The actual specific directions in which directional dial interface 21 moves image 45 will be discussed in detail below.

Although, the example herein uses a mouse as the pointing device it is well known in the art that other pointing devices would work as well as a mouse among them being: track balls, touch sensitive pads, light pens etc. Since these devices are now commonly used by anyone who uses a personal computer, and they are used in the standard fashion with the invention, there is no need to describe how they would work. Also, it is well known in the art how one would implement the use of such devices with computer hardware and software in a standard fashion without the need for any experimentation. It will also be readily perceived by those skilled in the art that a touch sensitive visual display or screen could be used for activation of the buttons of the directional dial interface 21. Such a touch sensitive screen could be activated by a human hand or stylus designed for such activity.

Returning to the directional dial interface 21, depicted in FIG. 1, the buttons of the second annular ring 26 and the third annular ring 28, when appropriately activated, provide for translational moves of the workpiece. In the preferred embodiment the eight buttons of annular rings 26 and 28 for purposes of description, can be thought to move the workpiece in the directions equivalent to the four points of the compass. Thus we shall designate the four sides of the visual display 41 as follows: the top as north (N), the bottom as south (S), the left side as west (W) and the right side as east A). Thus, buttons 30N and 32N would move image 45 north on the screen, buttons 30S and 32S would move image 45 south on the screen, buttons 30W and 32W move image 45 west on the screen and buttons 30E and 32E move image 45 east on the screen. The buttons of the second annular ring 26 namely 30N, 30S, 30W and 30E would move image 45 in small increments in their respective directions of motion. On the other hand the buttons of the third annular ring 28 namely 32N, 32S, 32W and 32E move image 45 in large increments in their respective directions of motion. Naturally, if the operator is viewing the image of an object in real time the initiation of movements of the image on the screen with appropriate hardware and software would result in corresponding movements of the object being imaged in its reference frame, generally the focal plane of an imaging device.

The system of the present invention, through the use of well known software and hardware devices and techniques, allows the operator to set the speed and distance each button of the second and third annular rings: 30N, 30S, 30E, 30W, 32N, 32S, 32E and 32W move the image 45 on the visual display 41. For example, the operator could set inner annular ring buttons 30N, 30S, 30E and 30W to move the workpiece or image 45 in small increments of about a millimeter for each click of the pointing device button 43A when the pointing device cursor 47 is placed on it. The operator could also configure the system such that when the pointing device cursor is placed on one of these buttons, 30N, 30S, 30E and 30W, and the pointing device button is held down for more then two seconds the image 45 moves at a rate of one millimeter every fifth of a second. Likewise, the operator could set the buttons of the middle ring 32N, 3SS, 32E and 32W, on activation, to move the image 45 in centimeter increments on the screen with each click of the pointing device button 43A while the pointing device cursor 47 is on the button activated. Additionally, the operator could provide for continuous movement of image 45 on depression of one of these buttons, 32N, 32S, 32E and 32W, for more than two seconds etc.

Thus it can be seen that the buttons of translational motion moves the image of the object 45 in a direction in which the arrows point on each of the respective buttons point. Each of the pairs of east, west, north and south buttons are in orthogonal relationship to the adjacent buttons with respect to the direction in which they move the image 45. Each pair of buttons moves image 45 in a direction 180 degrees to the pair of buttons on the opposite side of the common center 29.

Each of the buttons: pair 30N and 32N, pair 30S and 32S, pair 30E and 32E, and pair 30W and 32W could be considered to have an associated vector of motion equivalent to the arrows which appear on each in the directional dial interface 21. The direction of each vector being the direction the arrows point on each button. Buttons 30E and 32E move the image 45 in the direction of a vector pointing in the east direction on the screen which is at right angles i.e. orthogonal to the directional vector of the adjacent pairs of buttons, pair 30N and 32N and pair 30S and 32S, moves object 45. Button pair 30W and 32W, on the other side of the common center 29 from button pair 30E and 32E, move the image in the direction of a vector pointing to the west direction. The direction of the vector of pair 30W and 32W being 180 degrees from the direction of the vector of direction of pair 30E and 32E. Likewise, for each pair of buttons, as you move around the circle, buttons 30N and 32N move object 45 in the direction of a vector pointing to the north on the screen and button pair 32S and 30S moves image 45 in the direction of a vector pointing to the south.

By moving image 45 in any one of the four primary directions the appropriate number of times and in the proper sequence the operator can reposition image 45 anywhere in the reference frame on the screen. For example, assume the operator wanted to move image 45 to position 45A the operator could accomplish this transition with two moves, one in the east direction by activating buttons 30E or 32E and one in the south direction by activating button 30S or 32S. In fact, one potentially could move image 45 to any position in the visual display 41 with no more than two moves.

First annular ring 24 in the preferred embodiment surrounds the entire interface 21 forming its outer boundary. First annular ring 24 provides one means to rotate image 45. One activates annular ring 24 by moving mouse cursor 47 to the position 47C and placing the mouse cursor 47 on ring marker 34 of the first annular ring 24. Once mouse cursor 47 is placed on ring marker 34 the operator then clicks on the appropriate button on the mouse 43 and holds that button down and drags ring marker 34 around annular ring 24 which results in a corresponding rotational movement of image 45. In FIG. 1, assuming the axis of rotation of image 45 is at its center, moving ring marker 34 by the above method from position 56A to 56B results in a corresponding movement of image 45. Thus point 56AA on image 45 moves to position 56BB. The axis of rotation about which image 45 rotates is selected by default as the center of the image as initially acquired. However, as depicted in FIG. 1A the operator can change the axis about which the image 45 rotates by moving the cursor 47 to the appropriate position such as point 57, for the purposes of this example, and clicking on the appropriate mouse button Thus, if ring marker 34 is moved from point 56A to 56B with the axis of rotation at point 57 in FIG. 1A image 45 rotates to new position 45B.

Referring back to FIG. 1 center buttons 37 and 39 provide another means to initiate rotational motion of object 45. One of the buttons, such as 37, when activated by moving pointing device, cursor 47, to button 37 and depressing the appropriate pointing device button 43A rotates image 45 in a clockwise direction and the other button 39, when activated rotates it in a counter clockwise direction. In the preferred embodiment, each click of button 37 or 39 rotates the image in one degree increments. Additionally, by holding down button 37 or 39 for more than one or two seconds the image 45 rotates at a steady and moderate pace for as long as the cursor 47 remains on button 37 or 39 and the appropriate pointing device button, i.e. 43A or 43B, is depressed. The two center buttons 37 and 39 thus serve as the fine adjustments of angular positioning in the system of this invention and first annular ring provides for substantial and quick adjustments.

Alternative Interface Configurations

Figure 4A:
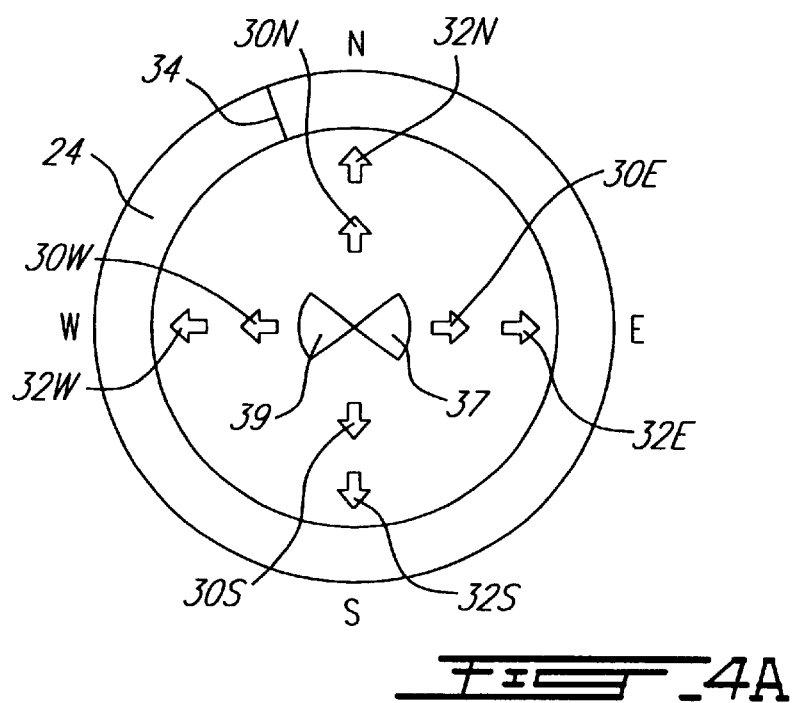
FIG. 4A provides an alternate arrangement for the interface of the present invention.

The interface of the present invention can take on different configurations and not depart from the fundamental concept of intuitive functionality it provides. The directional dial interface 21 could take on the configuration shown in FIG. 4A where the four pairs of buttons point towards the four points of a compass. The buttons are activated in the manner, as noted above, through use of a pointing device wherein the screen cursor 47 is placed over the arrow buttons 30 (N, S, E and W) or 32 (N, S, E and W) and clicked. Each of the pairs of buttons having the same function as described above with respect to movement.

Figure 4B:
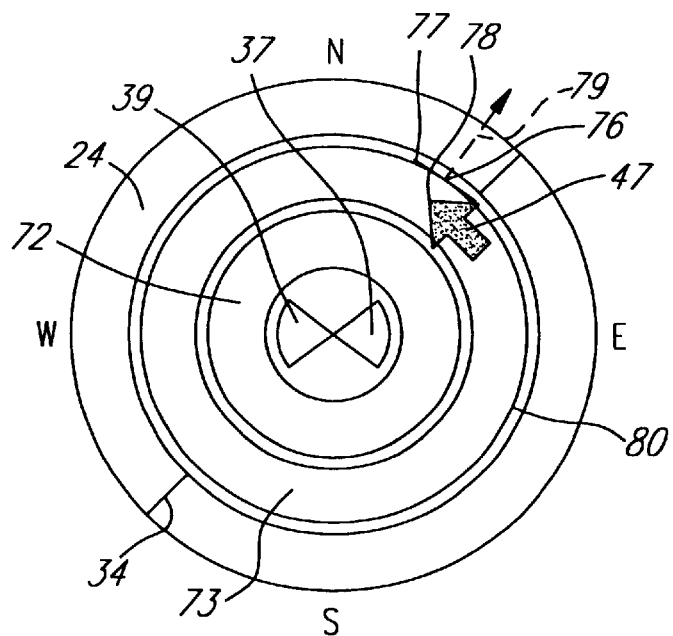
FIG. 4B provides a second alternate version of the interface of the present invention.
Figure 4C:
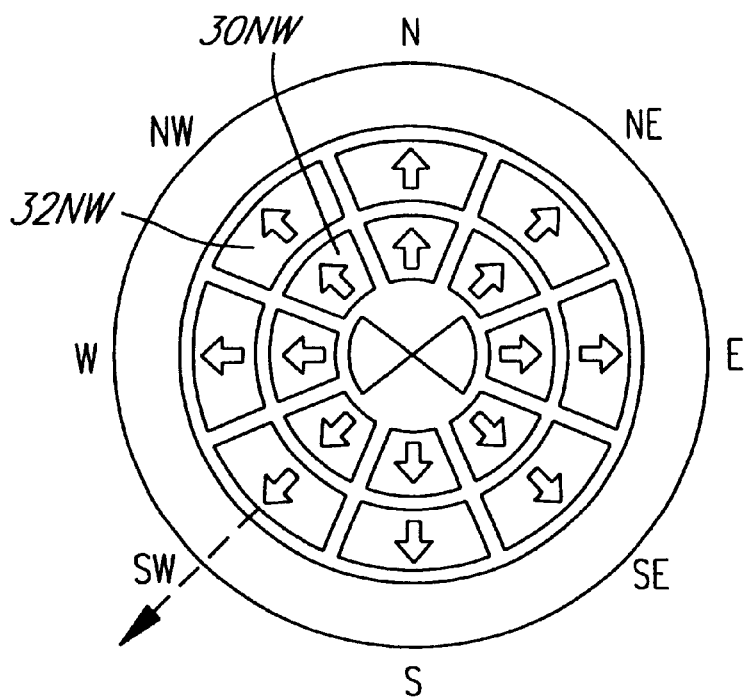
FIG. 4C provides a third alternate version of the interface of the present invention.

Another alternative configuration is to segment the third and second annular rings into more segments such as depicted in FIG. 4C. As shown, FIG. 4C the second and third annular rings are segmented into eight arcs. This results in eight sets of two buttons for a total of eight directions or compass points the image of the object, or the object itself, can be moved in within the frame of reference with only one click of the pointing device. For example, buttons 32NO and 30NO would move the image on visual display 41 in a northwest direction between the direction of button pairs 30W and 32W and 30N and 32N.

Figure 4D:
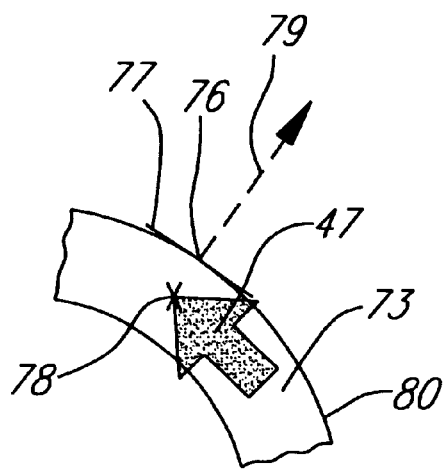
FIG. 4D provides a view of a portion of FIG. 4B.

In another alternative, as depicted in FIG. 4B, the second annular ring 72 and third annular ring 73 could be presented as solid rings. Here again the second annular ring 72 and third annular rings 73 would still be used for transitional movement of the object However, clicking the mouse cursor 47 on a section of the second annular ring 72 or third annular ring 73 would cause the image to move in a direction normal to a line tangent to the point on the outside curvature 80 which is closest to the spot on the ring clicked. For example, the computer operator would place the pointing device cursor 47 at spot 78, click and movement of the image in the frame of reference would occur in the direction of vector 79, a direction normal to the outside curvature or periphery 80 of the ring so activated, in this instance the third ring 73. The second ring could be for small incremental movements and the third ring would still be for large movements. FIG. 4D depicts a portion of annular ring 73 from FIG. 4B, specifically that portion around point 78. As can be seen thereon vector 79 is normal to tangent line 77. Tangent line 77 is tangent at point 76 on the outside periphery of annular ring 73. Tangent point 76 is the closest point on the outside curvature or periphery 80 of annular ring 73 to spot 78, the spot clicked by the operator to initiate movement of the image.

Other Uses

Figure 2:
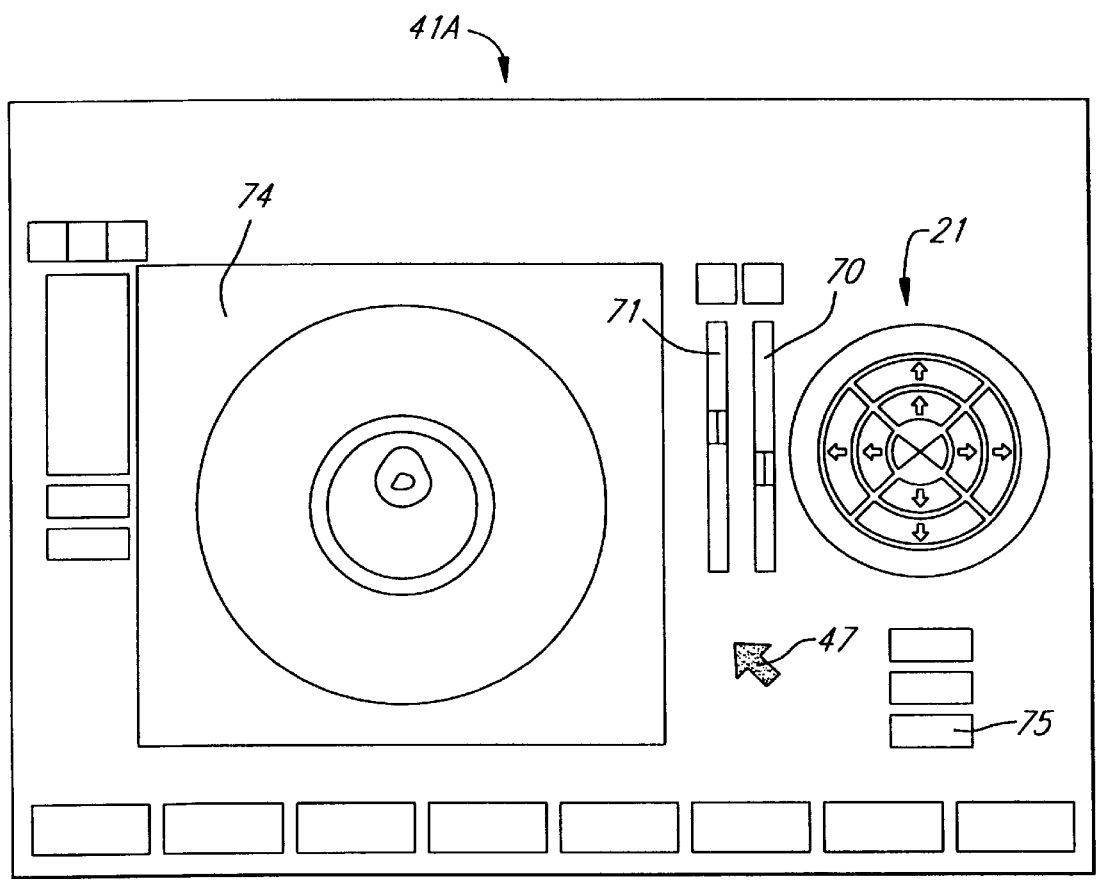
FIG. 2 is a view of a screen display which implements the interface of the present invention with other visual interfaces.

As mentioned above, the invention includes the feature of allowing the operator to control the positioning of an object in real time through use of directional dial interface 21. The purpose of positioning the object could be for obtaining an image for storage and later analysis, to work on the object positioned or for the handling of toxic or dangerous materials in a secure area removed from the operator. FIG. 3 shows a system set up to position an object 65 for imaging. Computer 48 using the appropriate software controls, the screen 61, as well as optical Imaging device 63 and positioning stage 64 for this system. Technologies including hardware and software for implementing and controlling such devices are well known in the art. The operator would exercise control through keyboard 49 and pointing device 43. FIG. 2 shows the directional dial interface 21 of the present invention integrated on interface 41A with various other interface devices to form an extended system. The interface system of interface 41A would then appear on screen 61. However, the additional interface apparatuses are not essential for practicing the present invention.

The operator through use of directional dial interface 21, in the manner described above, would then position the object 65 in the appropriate position for imaging. Use of directional dial interface 21, in the manner described above, would result in movement of object 65 to the appropriate position through instructions sent by computer 48 to positioning stage 64. The operator could also control the brightness of the object by slide 71 and focus of the optical device 63 by slide 70. Both interface device 71 and 70 are well known in the art as well as techniques for control and use of optical devices such as 63, which not only has a standard optical imaging device, it also has the appropriate means to transmit the image viewed, in a form, which can be displayed on screen 61. As noted above the system has a common reference frame. The image acquisition process Is made up of two parts. The visual display provides the primary reference frame and the focal plane of the imaging device provides the secondary reference frame.

The operator on screen 61 would then view the image so captured as depicted in window 74 on interface 41A. The signal transmitted by optical device 63 could either be an analog or a digital signal. Suitable apparatus and techniques well known in the art could be used. In the preferred embodiment the imaging device 63 would include a charged coupled device (CCD) well known in the art. This transmits a digitalized signal of that image. After making the appropriate adjustments to obtain an optimal image, as described above, the operator could instruct the system, by activating button 75, to save the image to a storage device, not specifically shown, but which would be part of the computer system 48 and certainly well known in the art. The image so obtained could be saved as a file in the usual manner and held for later retrieval and use.

Various Modes and States of Operation

The invention has been described in fairly general terms up to this point. The following description will discuss implementation of the invention in a system which takes images of objects, stores those images and subsequently uses those images for comparison and analysis with other similarly obtained images. The Integrated Ballistics Identification System or IBIS of Forensic Technology provides a still developing system for automated and systematized forensic ballistics analysis. The system relies in part on computers and thus control and operation would be significantly enhanced with user friendly interfaces among other things. A number of patents have issued relating to different aspects of this automated forensic ballistics analysis system such as the following: U.S. patents: "Method And Apparatus For Monitoring And Adjusting The Position Of An Article Under Optical Observation" U.S. Pat. No. 5,379,106; "Computer Automated Bullet Analysis Apparatus" U.S. Pat. No. 5,390,108; "Method For Monitoring And Adjusting The Position Of An Object Under Optical Observation For Imaging" U.S. Pat. No. 5,633,717; "Fired Cartridge Examination Method And lavaging Apparatus" U.S. Pat. No. 5,654,801; And "Method And Apparatus For Obtaining A Signature From A Fired Bullet" U.S. Pat. No. 5,659,489. All of these patents are incorporated herein by reference.

An overview of the implementation of the directional dial interface of the present invention in the IBIS ballistics analysis system will be discussed with the aid of flow charts. Then specific implementations of the directional dial interface in the IBIS ballistics analysis system will be reviewed. FIG. 5 and 6 provide flow charts with the major functional elements of the current preferred embodiment of the system which uses the directional dial interface of the present invention. Only so much of this system will be described, as is necessary, to understand the fill capacity and functionality of the directional dial interface.

First the program is activated, 79 FIG. 5, and then the operating mode 80 is selected. The system has two operating modes, image acquisition mode 90 and image comparison, analysis and manipulation mode 81 FIG. 6. If the image acquisition mode is selected, then one of two sub-modes must be selected, either the sub-mode for acquisition of the image of a cartridge case 91 or the sub-mode for acquisition of the image of a spent bullet 93. If the sub-mode for acquisition of the image of the cartridge case 91 is selected then directional dial interface 21 is generated on the visual display together with the rest of the working interface. Starting the sub-mode for acquisition of images of the cartridge case 91, in the preferred embodiment, only activates the buttons of transitional motion 92. On the other hand, staring the sub-mode for acquisition of images of the spent bullet 93 activates not only the buttons of translational motion 94, it also activates a unique sub-state which uses the first annular ring which will be described in detail below. Briefly, this sub-state assists in assuring that the operator has successfully obtained images of the land engraved areas on a spent bullet being imaged. As the operator rotates the spent bullet imaging the land engraved areas on the spent bullet those portions successfully imaged are mapped as depressions to the first annular ring. This allows the operator to keep track of what has been imaged and know when all of the land engraved areas on the spent bullet have been imaged.

After activation of the program 79 the operator also has the option of starting the image comparison, analysis and manipulation mode 81. Then depending on whether or not the operator wants to compare previously acquired images of spent bullets or shells he selects either the spent bullet comparison, analysis and manipulation sub mode 82 or the cartridge case analysis, comparison and manipulation sub mode 84. If the spent bullet comparison and analysis sub mode 82 is selected the directional dial interface 21 is generated on the screen. Interface 21 appears on the screen with the other related interfaces, but only its buttons of translational movement are activated.

If the cartridge case analysis mode 84 FIG. 6 has been selected after generation of the directional dial interface 21 and the other related interfaces of the system have been generated 85 then the buttons of translational and rotational motion are activated. However, the operator must still select a state to operate in from a choice of three possible operational states available in the cartridge case analysis mode. In the cartridge case analysis mode, the operator usually has two images on the screen to work with, one is an image of a reference object which will be compared to another image, the image of a test object Both images are of spent cartridge cases and the purpose is for comparison, to determine if a match exists, such as, were both fired from the same firearm. Thus, the operator can switch into the image of the reference object manipulation sub-state 87 to move the reference image around. The operator can then switch to the image of the test object manipulation sub-state 88 to move the test image around Finally, the operator can switch to an image comparison sub-state 89 which joins both images as one image separated by a line of separation. As will be discussed in detail below half of each image, such as half of the image of the test object and half of the image of the reference object, appears together separated by a line of separation. Rotation of the line of separation, as described below about a central axis progressively reveals different portions of each image so the both can be compared simultaneously.

Detailed Implementation

Figure 8:
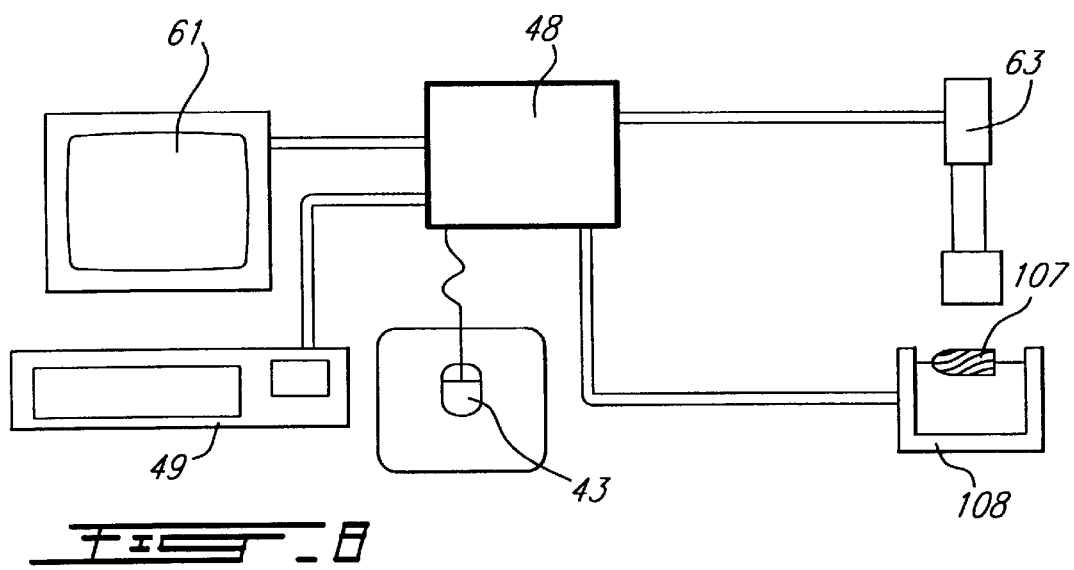
FIG. 8 provides a schematic of a system with which the screen display in FIG. 7 would be used.

As noted above, after selection of the spent bullet image acquisition sub mode 93 FIG. 5 the program generates the directional dial interface 21 on the screen together with the associated interfaces and activates the interface 94. FIG. 8 depicts schematically the basic components of the spent bullet image acquisition system. The system includes a screen 61 connected to an appropriately programmed computer 48. The operator controls the computer with keyboard 49 and pointing device 43 in the usual manner. The computer in turn controls optical imaging device 63 and spent bullet holding and positioning stage 108. The operator thus can position the spent bullet 107 to take appropriate images as will be described shortly. Various components of this system are described in detail in U.S. Pat. Nos. 5,379,106; 5,390,108; and 5,659,489 which were discussed above and incorporated herein by reference.

The spent bullet 108 being imaged appears in FIG. 9. The spent bullet, generally made of lead or copper, after being forced down the barrel of gun by the explosion of the gun powder has etched thereon land engraved areas 109. The rifling in a gun barrel consists of spiral alternating grooves and raised areas, called land areas. It is well known that gun rifling, a feature used for at least the last 100 to 200 years, imparts a spin to the bullet as it travels down the barrel and in so doing adds incredible stability to the spent bullet on leaving the barrel. This stability in turn substantially increases the range and accuracy of the bullet fired from the gun. It has also been known since at least the first part of the twentieth century that the land areas of each gun when they etch the land engraved areas (LEA) on a spent bullet, also leave unique markings or striations which can identify the gun from which the spent bullet was fired.

Figure 7:
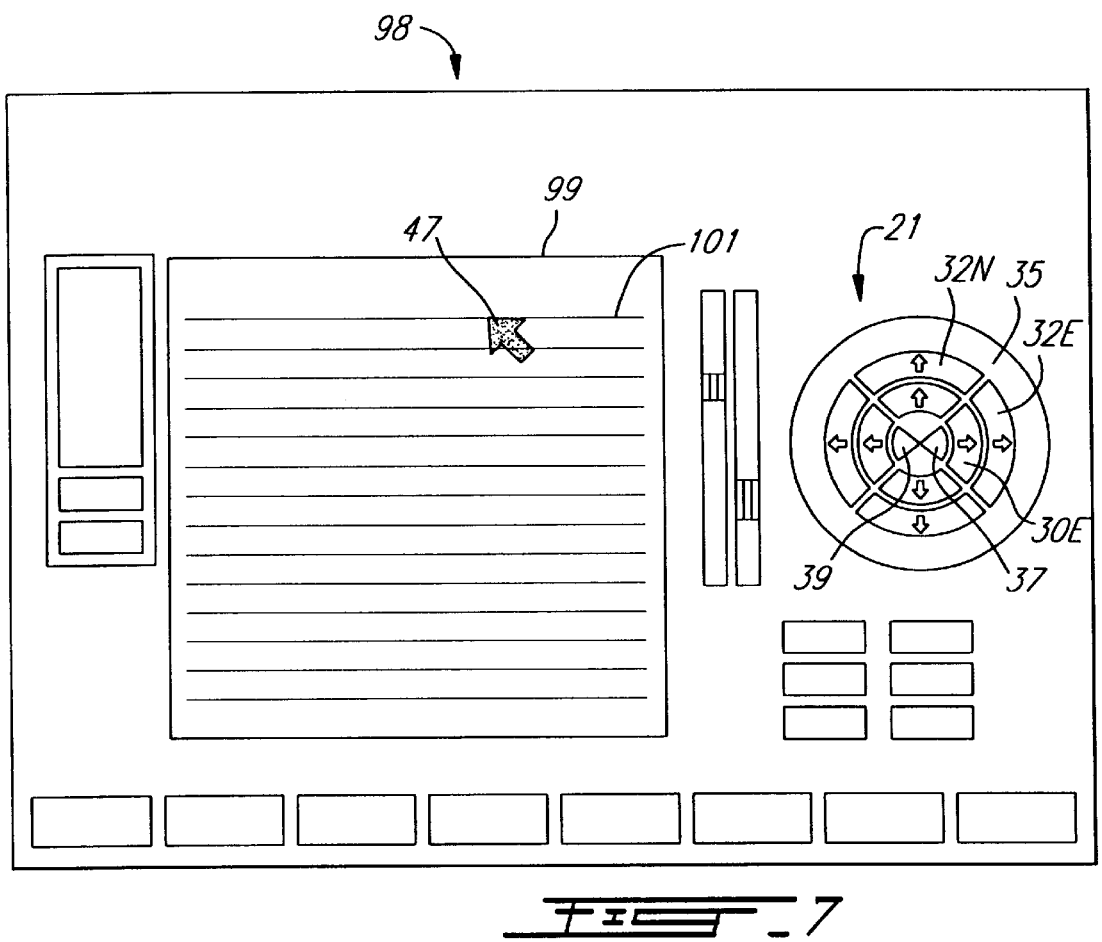
FIG. 7 is another screen display which implements the interface of the present invention with other visual interfaces.

Referring to FIG. 8 the operator will successively obtain images of each LEA on spent bullet 107 as it is rotated in spent bullet holder 108. The directional dial interface 21 FIG. 7 provides the operator with the means of keeping track of the images of the LEA's as he or she rotates the spent bullet taking the images. The operator actually views a magnified image of the LEA in window 99 in interface 98. Interface 98 appears on screen 61 FIG. 8. The operator picks out a shoulder 110 FIG. 9 at the beginning of a LEA 109 and marks it with mouse cursor 47 FIG. 7, the operator then activates reference mark 35 on the directional dial 21 making it correspond to the first shoulder on the spent bullet The operator then rotates the spent bullet 107 in holder 108 moving down the LEA taking appropriate images of it and stops at the shoulder 110 on the opposite side of the LEA 109. Once the operator has successfully acquired an image or images of that LEA an indentation 111 FIG. 10A appears on the outside of the first annular ring 24. Thus, the operator slowly rotates the spent bullet in holder 108 and successively obtains images of each LEA. Indentations 112 FIG. 10A and 10B and indentations 113, 114, 115 and 116 on FIG. 10B represent each successive LEA successfully imaged by the operator. This feature allows the operator to keep track of each LEA successfully imaged. It will be readily seen that this feature also has broader application to situations where one has to image the surface of a cylinder or note distinguishing features on the surface.

Referring back to FIG. 7, the other functions of the directional dial interface 21 remain the same. The buttons of translational motion 30(N, E, S and W) and 32 N, E, S and W ) perform the same function and allow the operator to move the image about to optimally position it for imaging. Likewise, rotational buttons 37 and 39 allow the operator to adjust the angular relationship of the image to the viewing window 99 to also help optimize the image obtained.

If the operator selects the cartridge case imaging submode 91 and 92 FIG. 5 the program generates the overall interface which appears in FIG. 2. Schematically the basic functional parts of this image acquisition system appears in FIG. 3. The system as it appears in FIG. 3 and the overall interface 41A of FIG. 2 have already been described in detail above as they relate to the directional dial interface 21. U.S. Pat. No. 5,654,801 identified and incorporated herein by references discloses a cartridge case examination and imaging method and apparatus which would work with the system.

Figure 11:
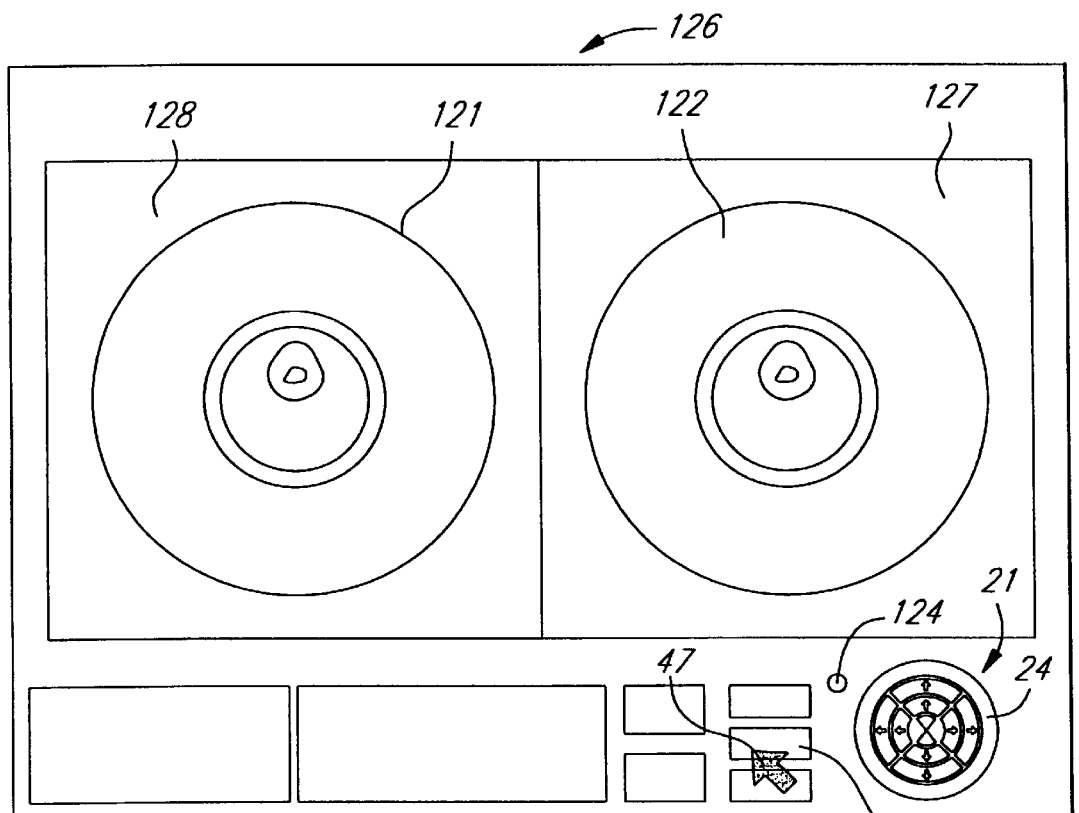
FIG. 11 is a view of a screen display which incorporates the interface of the present invention in a cartridge case analysis mode.
Figure 12:
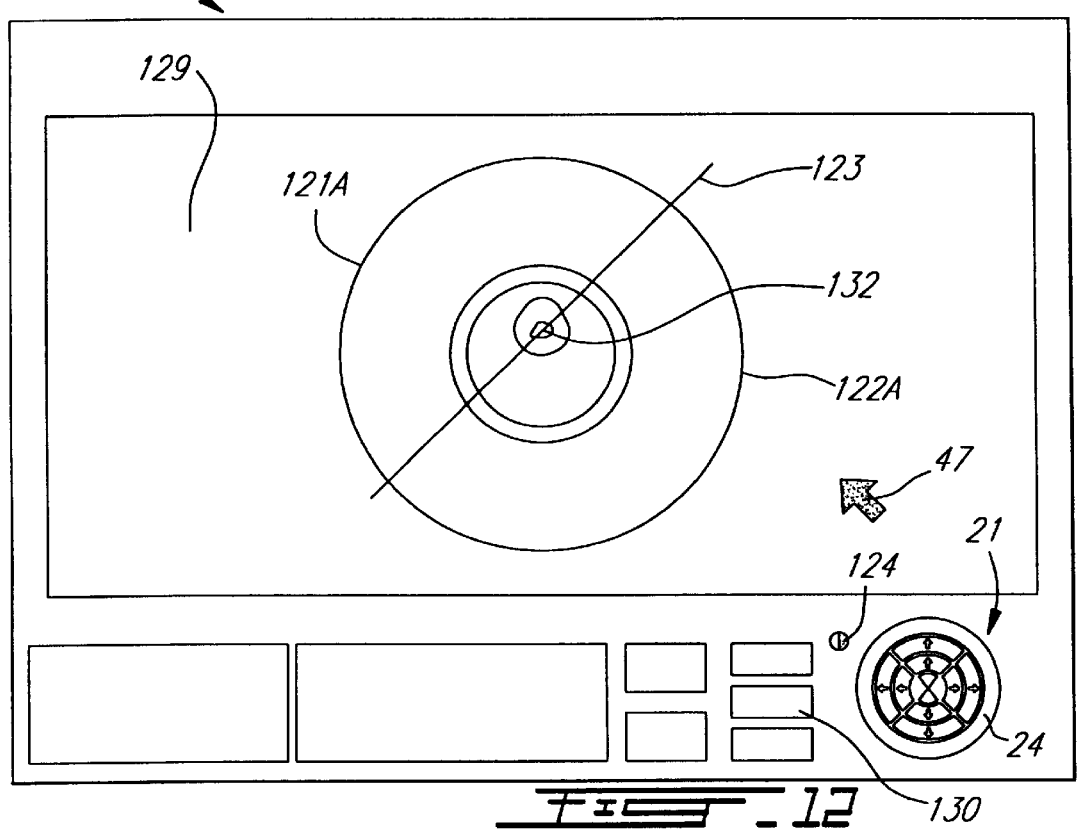
FIG. 12 is a view of a screen display of another implementation of the interface of the present invention in a cartridge case analysis mode.

If the operator selects the cartridge case image comparison n, analysis and manipulation mode 84 and 65 FIG. 6 interface 126 FIG. 11 would appear on the visual display. The Initial display besides having the interface features depicted including the directional dial interface 21 of the present invention has two separate windows, window 127 which has the image of the test object 122, in this case the cartridge case under examination and window 128 which has the reference object 121, another cartridge case image, to which the test object 122 is to be compared. The operator has the option of making either window 128 or 127 active by placing the cursor 47 of the system pointing device on button 130 and depressing the left pointing device button. By making either window 127 or 128 active, the operator can then manipulate the image in the active window with directional dial 21. Thus as discussed in detail above, translational buttons 30 (N, E, S and W) and 32 (N, e, S and W) would allow the operator to move the image of the object around as described above. Likewise, the operator could rotate the object with central buttons 37 and 39 or with the first annular ring 24 in the manner described above to place the object in the active window in the proper angular orientation. Indicator 124 tells the operator which window is active. In the preferred embodiment when window 127 is active indicator 124 is clear or lightly shaded 124A FIG. 11A. If window 128 is active then indicator 124 is dark in color 124B as depicted in FIG. 11B. The operator can also put the system into a third state as depicted in FIG. 12. If the operator puts the system into this third state indicator 124 is halt dark and half light 124C FIG. 11C.

Figure 13:
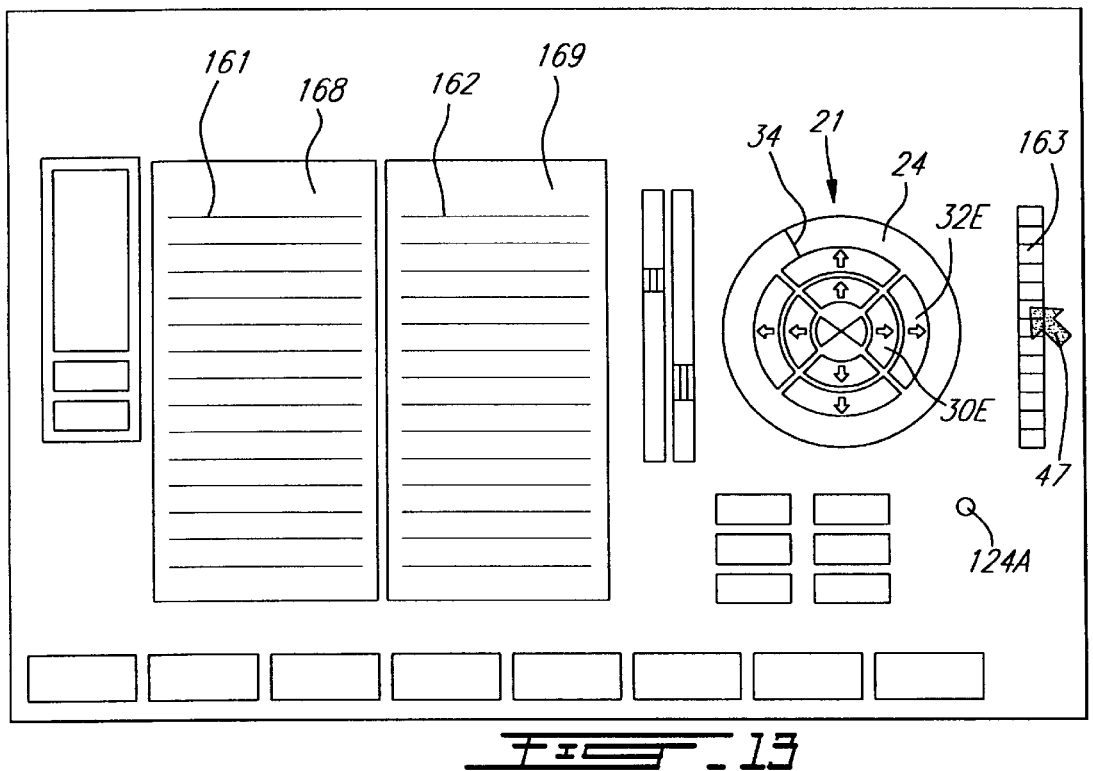
FIG. 13 is a view of a screen display which incorporates the present invention in a spent bullet analysis mode in which the image of the test and reference bullets occupy their own windows.

In the preferred embodiment the directional dial 21 is also utilized in the analysis submode 82 for movement of the spent bullet image in vertical and the horizontal direction. FIG. 13 depicts how the overall interface appears in this mode with the directional dial 21 implemented for use to supplement the system. The buttons of translational movement 30 and 32 (N, E, S and W) on dial 21 move the image of the reference image 161 in window 168 or the image of the test object 162 in window 169 depending on which of the two windows 168 or 169 is active. When window 169 is active and the test image 162 can be manipulated activity indicator 124 is clear 124A FIG. 11A. When window 168 is active and the reference image 161 can be manipulated then activity indicator 124 is dark 124B FIG. 11B. When window 168 is active the system is in the reference image substrate 83B FIG. 6 of the spent bullet analysis mode. When window 169 is active the system is in the test image substrate 83C FIG. 6 of the spent bullet analysis mode.

Figure 13A:
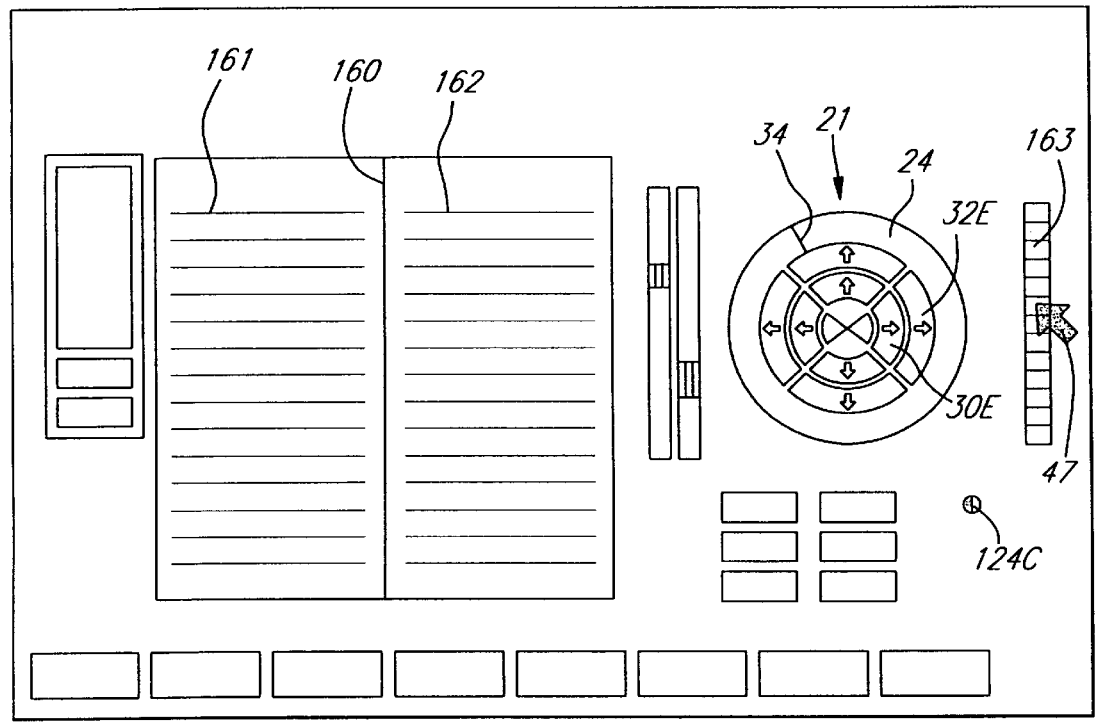
FIG. 13A present invention in a spent bullet analysis mode in which the image of the test and reference bullets are combined in an overlapping mode in the same window with the images separated by a line of separation.

The reference image 161 and the test image 162 can also be combined in one window as depicted in FIG. 13A. There the images are overlapped with the images separated by a line of separation 160. The line of separation can be moved horizontally back and forth with buttons 30E, 32E, 30 W and 32W. The line of separation can also be moved back and forth by placing cursor 47 on it and dragging the line 160 back and forth By moving the line of separation back and forth the operator can successively reveal different portions of each spent bullet. Moving the line of separation 160 to the left would reveal more of test image 162 and cover-up part of 161. On the other hand moving line of separation 160 to the right would reveal more of reference image 161 and cover up portions of test image 162. When the images are combined in one window as depicted in FIG. 13A activity indicator 124 is half dark and half light as depicted by 124C FIG. 11C. When the images of the test and reference spent bullets 161 and 162 are combined as depicted in FIG. 13A in this overlapping mode the system is in the combined image comparison substrate 83D of the spent bullet analysis mode.

On FIGS. 13 and 13A appears virtual thumb wheel 163 which an operator of the system uses to stretch or compress the images of the spent bullets displayed on the screen ring the image analysis mode. In the preferred embodiment the thumb wheel 163 is only used with the spent bullet image analysis mode 82 FIG. 6. One positions the mouse cursor 47 on the wheel 163 generally at its center and moves the cursor 47 up or down on virtual thumb wheel 163. In the preferred embodiment when the operator moves the cursor 47 up on the thumb wheel 163 the image in the active window stretches out in a uniform and proportional manner along the vertical axis of the image so that its individual features can be more easily studied. When one moves the cursor down on the thumb wheel it compresses the image in the active window. Compression occurs in a uniform and proportional manner for the image along the vertical axis of the image. In the preferred embodiment compression and stretching of the image occurs in a uniform manner only in one dimension, along the vertical axis of the image which is generally perpendicular to the direction of the land engraved areas on the image of the spent bullet. However, if necessary the apparatus could be adapted to stretch the image in more than one direction. This stretching or sizing apparatus controlled by thumb wheel 163 aids in analysis of spent bullets which have been deformed to some extent on impact after firing but the striations left on the land engraved areas can still be observed and analyzed. To return the image to its original dimensions the operator merely clicks twice on the center of the thumb wheel 163. The operator can switch between the two windows 168 and 169 by clicking twice on the window to be activated or by clicking twice on the on indicator 124 which successively cycles the system through each of the three sub states 83B, 83C and 83D.

Reference was made above to the IBAS system and patents which relate to that system. A discussion then ensued in general terms which described how the present invention related to the IBAS system and the identified and incorporated various US patents with specific reference to the use of those patents. Another application involving one of those patents will now be discussed. U.S. Pat. No. 5,633,717 mentioned above and incorporated by reference herein describes an apparatus and method for scanning and then imaging an object. The '717 provides for an initial scan of the object, in the preferred embodiment, a spent bullet to obtain a mathematical function approximating the surface scanned. It creates this function by measuring the distance between the surface of the spent bullet or object being imaged and the camera or imaging device. The practice of the '717 invention then uses this information to calculate a mathematical function of the surface contours of that portion of the spent bullet or object scanned. The system of that invention then uses the function obtained from the scanning path to obtain an optimal imaging path. What the initial scanning path amounts to then is a function of the contour of the outside surface scanned.

The practice of the '717 patent can easily be incorporated into the practice of the current invention. The function obtained in the initial scan according to the practice of the '106 patent can be mapped to the first annular ring 24 so it provides an outline of the contours of the surface of the object scanned. Then as those portions of the scanned area are imaged, the imaged areas can be designated on the first annular ring 24, Often, the spent bullets obtained at a crime scene are deformed or are fragments. This results from the fact that the bullets or bullets are most often made of lead or brass which shatter or become deformed to some extent on impact after being shot. FIG. 14A depicts a portion of a deformed bullet being scanned to create the mathematical function of the scanning path. Optical imaging device 63 scans bullet fragment 131 as it rotates about on axis 142. Axis 142 is perpendicular to the plane of the paper and forms the rotational axis of a spent bullet holding and rotating device. FIG. 8 schematically depicts the various major parts of the system. U.S. Pat. Nos. 5,379,106 and 5,390,108 already incorporated by reference herein go into specific detail on various related aspects the systems and devices used.

As can be seen in FIG. 14A the spent bullet 131 only has two relatively intact LEAs over the surface being scanned LEA 137 and 139. spent bullet 131 has two LEA's partially intact 138 and 140. FIG. 14B depicts the interface 143 with the function of the scan obtained from spent bullet 131 mapped to the periphery of annular ring 145. As can be seen, intact LEA's 137A and 139A appear thereon. Partial LEA's 138A and 140A also appear thereon. That portion of the spent bullet missing is indicated by dashed line 144. Also, x's 146 indicate a significant departure of the circumference of the spent bullet from its original shape as a result of its deformation. FIG. 14C depicts the interface 143 after successful image acquisition of the LEA's. Images as indicated by the hatched lines at 137T, 138B, 139B and 140B indicate the successful image acquisition. Any number of options exist for indicating on the display successful imaging of LEA's including color coding.

Although, in some aspects the present invention could be implemented on an electromechanical system, in the preferred embodiment, it is implemented on a programmable computer. Specifically, a programmable digital computer system is used in the preferred embodiment. In the last 10 to 20 years progress in the development of programmable digital computers has been astounding. Computer hardware, has in fact, become a commodity and now software in a sense has become a commodity. Those skilled in the art, on reading the proceeding disclosure, will know that by using standard software writing techniques as well as available software modules appropriate software programs can be prepared to implement the invention as described herein without the need for any experimentation. In fact the present invention could be implemented in a variety of software languages i.e. C, Unix etc. Additionally, it could be written to operate on a variety of operating systems including Window®D, Windows NT®, Unix based operating systems etc. Since there is nothing unique about the software necessary to implement the present invention no detailed source code is included. For example, the software necessary to generate a signal when an operator touches button 32E FIG. 1 to cause workpiece, in this case, an image, 45 to move it can be written any number of different ways to accomplish the result. Thus, in a sense the means for movement of the workpiece is in fact generic and pro forma. The same could be said of all of the other software necessary to run and control the operation of the concept of the present invention.

Regarding the mechanical and other techniques for the focusing of the imaging device, positioning of the work piece etc., these are generally generic and well known to those skilled in the art. The exceptions being those concepts claimed in the various patents which have been cited herein and incorporated by reference herein.

Figure 15:
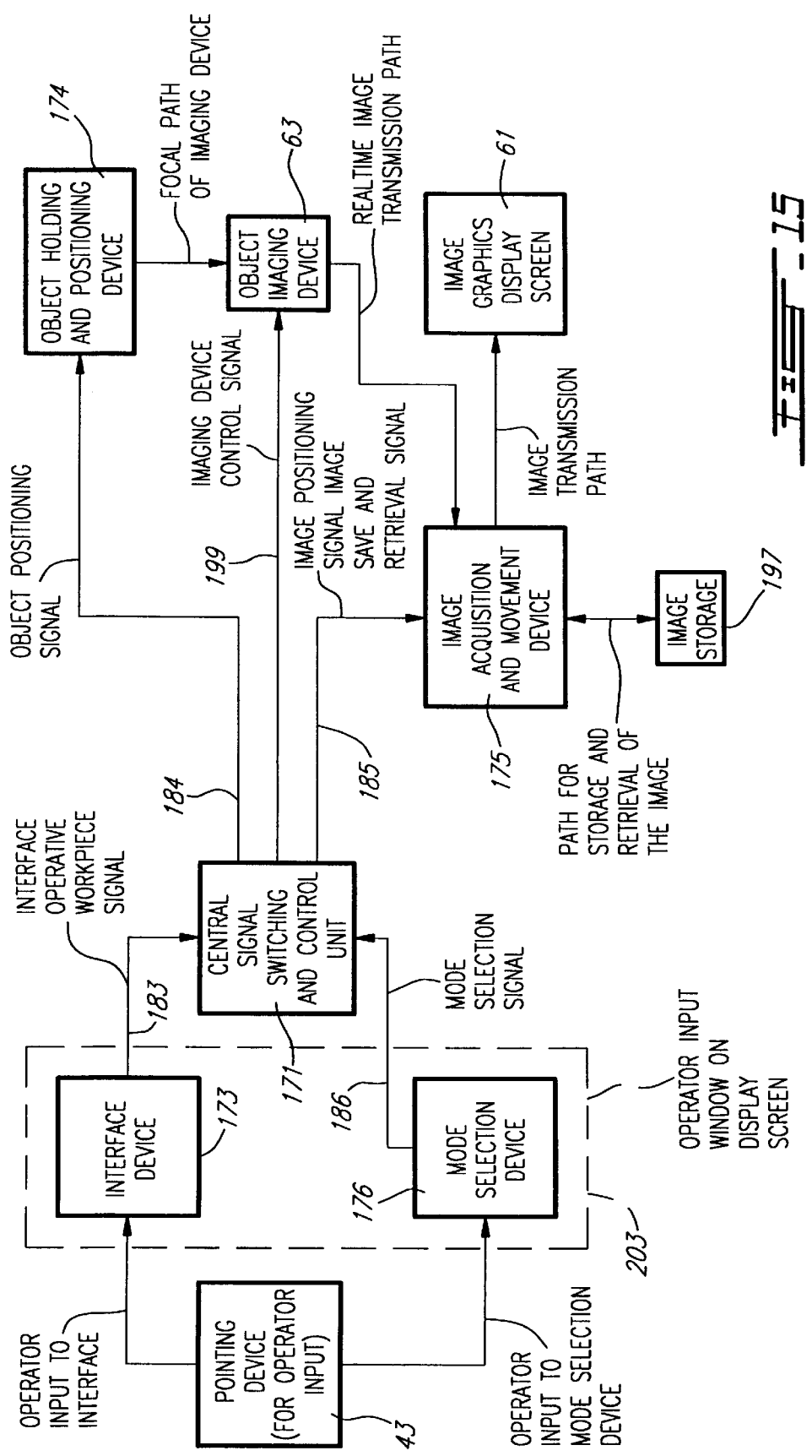
FIG. 15 is an operative schematic view of the present invention presented in the drawings and description herein.

FIG. 15 provides an operative view of the system and its functional states. The interface 173 and mode selection device 176 would appear on the screen in an operator input window 203 in the preferred embodiment. Initial operator input to the mode selection device 176 selects one of the two available operating modes either an image acquisition or an image analysis mode. For example if an operator selects the image acquisition mode using pointing device 43 by inputting to mode selection device 176 this in turn transmits a mode selection signal 186 to the central signal and control unit 171. The operator then with pointing device 43 applies input to the interface device 173 which results in generation of a workpiece operative signal 183 which prompts the central signal and control unit 171 to transmit an object positioning signal 184 to the object holding and movement device 174. The workpiece being both the object being imaged in real time as well as the image of the object which would appear on the screen 61 which would make up part of the image acquisition means. The object imaging device 63 transmits the focused image to image acquisition and movement device 175, an appropriate combination of hardware and software. Image acquisition and movement device 175 transmits the Viewed image in real time to screen 61 as wall as saving the selected image to image storage 197. Many of these aspects have been discussed in detail above. If the operator selects the image analysis mode through input with a pointing device 43 to the mode selection device 176 it generates mode selection signal 186 to central signal and control unit 171. Then operator input to the interface 173 with pointing device 43 results in generation of operative signal 183 to central signal and control unit 171 which then transmits image movement signal 185 to image movement device 175 for movement of the image on screen 61.

Figure 15A:
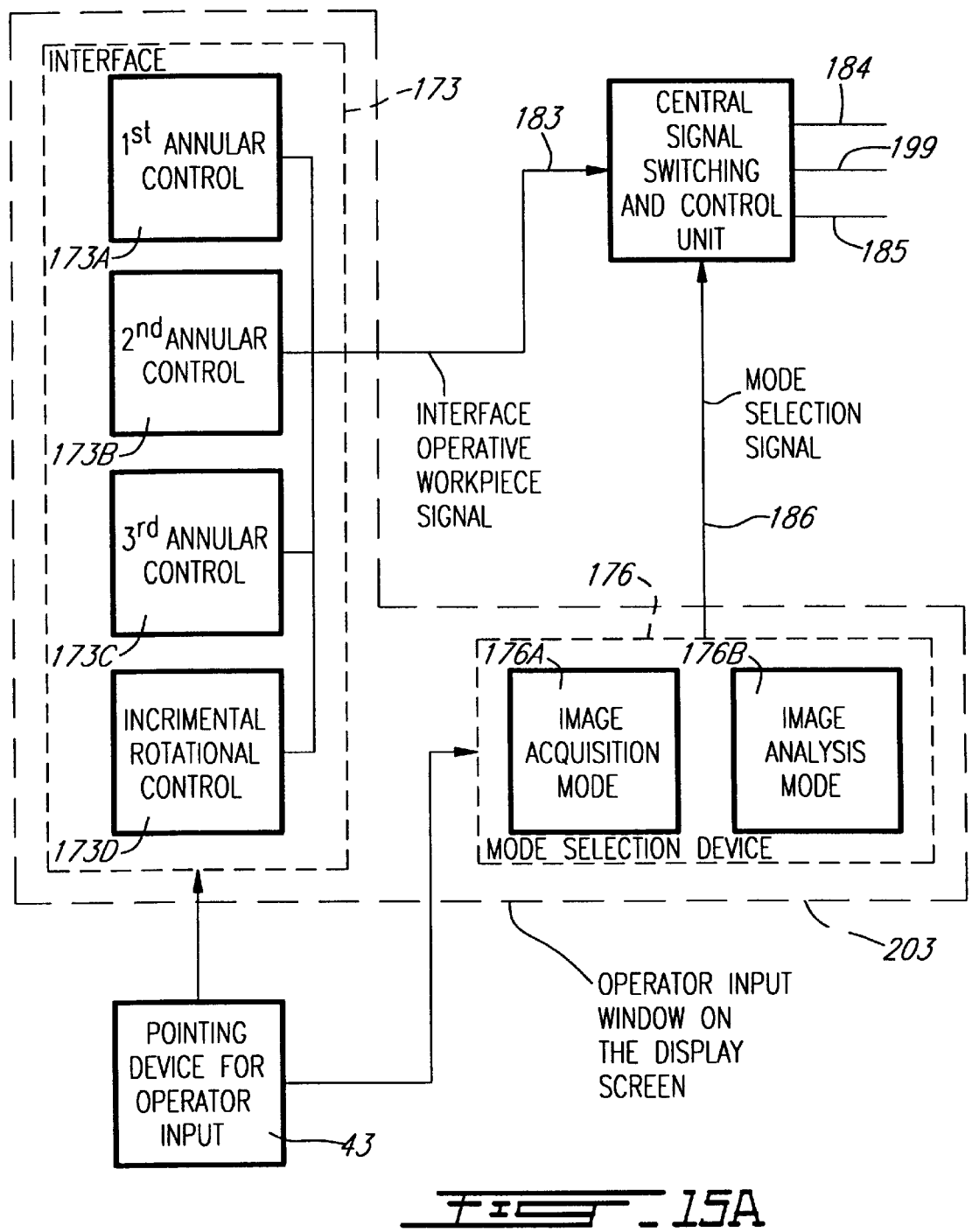
FIG. 15A is a portion of the operative schematic view of FIG. 15 of the present invention with the various parts of the interface of the preferred embodiment of the present invention represented.

As can be seen with FIG. 15A the interface device 173 in the preferred embodiment consists of four different parts: the first annular control 173A, second annular control 173B, third annular control 173C and incremental rotational control 173D. Operator input to each results in generation by each of their respective operative signals 183A, 183B, 183C and 183D for movement of the workpiece. The work piece being the image of an object or the image and the object imaged. Depending on the mode selected through mode selection device 176 by selection of 176A or 176B the central signal and control unit 171 would generate the object positioning signal 184 or the image positioning signal 185. As noted above in detail each of the parts of interface 173 would generate an operative signal which would initiate a specific type of movement in the workpiece as follows: the first annular control 173A would cause rotational motion of the workpiece, the second annular control 173B would cause small translation moves in the workpiece, the third annular control 173C would cause large translational moves in the workpiece and the incremental rotational control 173D, the two central buttons 37 and 39 in FIG. 1, would rotate in small movements. The image acquisition mode as noted in detail above has a sub-mode in which the surface profile of an object is mapped to the periphery of the first annular control means. The term mapping meaning the outside periphery of the first annular shape is changed to resemble the surface contours of the object imaged. Also, as described above in detail the image analysis mode in a certain aspect of its operation has three sub-operating states.

While the invention has been particularly shown and described with reference to a preferred embodiment thereof, it will be understood by those skilled in the art that various changes in form and detail may be made to it without departing from the spirit and scope of the invention.

We claim:

1. An interface apparatus having a command and control mechanism for manipulating a workpiece positionable by movement means, said apparatus comprising:

a programmable computer with a visual display;

a first annular control means responsive to operator input for generating a rotational control signal for rotating said workpiece within a common reference frame;

a second annular control means responsive to operator input for generating a translational motion control signal for movement of said workpiece within the common reference frame; and such movement allowing the operator to position the workpiece for at least one of the following imaging, analysis and comparison, wherein the workpiece is both an object and an image of said object and said programmable computer is in functional communication with an imaging device and an object positioning device, the imaging device being placed in relation to the object positioning device such that upon operator input, applied through said interface, the programmable computer can generate the necessary control signal to position the object held by the object positioning device in a focal plane of the object imaging device so that the imaging device can focus on the object and transmit to the programmable computer for display on the visual display the image of that object so obtained.

2. The interface apparatus of claim 1 which fierier comprises a third annular control means for generating a translational motion control signal, for movement of the workpiece within the reference frame, wherein the control signal generated by the second annular control means moves the workpiece in small increments and the signal generated by the third annular control means moves the workpiece in large increments.

3. The interface apparatus of clam 1 wherein the two annular control means are concentric so that they share a common center.

4. The interface apparatus of claim 3 which further comprises, at the common center of the first and second concentric annular control means, at least two actionable buttons, the first button when activated rotates the work piece in a clockwise direction and the second button when activated, rotates the work piece in a counterclockwise direction.

5. The interface apparatus of claim 1 wherein the second annular control means is segmented into four equal arcs, with each arc forming a separate button for directed motion, which on individual activation of each button generates a control signal for movement of the workpiece on a vector in a direction which is radially away from a common center of the arcs and normal to a tangent at a center of a peripheral outside edge of the arc so activated, the arcs being so positioned that the direction of a vector of any one arc is perpendicular to the direction of vectors of the two adjacent arcs when each is activated by operator input, and 180 degrees from the direction of a vector of an arc on the opposite side of the common center of the arcs when activated by operator input.

6. The interface apparatus of claim 5 wherein the interface includes a third annular control means, also segmented into four equal arcs, each arc so formed being paired with an arc of the second annular control means so that the paired area form two buttons for movement of the workpiece along a vector in the same direction, one of the arcs of each pair providing for small incremental movements of the workpiece and the other arc of each pair providing for large incremental movements of the workpiece.

7. The interface apparatus of claim 1 wherein the control signal generated by operator input at a selected spot on the second annular control means moves the workpiece within the common reference frame in a direction of a vector radially away from a common center of the second annular control means and normal to a tangent line formed at the closest point on an outside periphery of the annular control means to the selected spot on the second annular control means activated by operator input.

8. The interface apparatus of claim 1 wherein the first annular control means can be switched between a first operational state wherein it rotates the object and a second operational state wherein contours of a surface of the object can be mapped to an outside periphery of the first annular control means so that a representation of the contours of the surface of the object appears on the outside periphery of the first annular control means.

9. The interface apparatus of claim 8 wherein the second operation state maps those portions of the contours of the object which have been successfully imaged and stored in a memory by the programmable computer.

10. The interface apparatus of claim 9 wherein the object imaged is a spent bullet and the first annular control means of the interface apparatus in the second operational state displays on its outside periphery contours of land engraved areas of the bullet successfully imaged and stored by the programmable computer in a memory.

11. The interface apparatus of claim 1 wherein the workpiece is an image of a reference object and an image of a test object and the programmable computer can simultaneously display on the visual display an image of a test object and an image of a reference object and operator input applied through the interface can switch the programmable computer between three different image analysis states, a first state for manipulating the image of the test object, a second state for manipulating the image of the reference object and a third state for manipulating the combined images of the test object and the reference object.

12. The interface apparatus of claim 11 wherein when the interface is in the third state, the image of the test object and the reference object are joined together on the visual display in an overlapping configuration with the visible portions of the image of the reference object and the image of the test object separated by a line of separation, the line of separation being manipulated by operator input means.

13. The interface apparatus of claim 12 wherein operator input to manipulate the line of separation, while the interface is in the third state, causes the line of separation to rotate about a central point, which as it rotates it successively reveals different portions of the overlapped images of the test object and the image of the reference object so that the operator can compare and analyze them.

14. The interface apparatus of claim 1 wherein the first annular control means has an operator actionable marker, which marker as the operator moves it around the first annular ring generates the signal which causes the workpiece to rotate in the same direction through the same angular distance as the marker is moved by the operator on the first annular control means.

15. The interface apparatus of claim 1 wherein the operator activates the interface with a pointing device.

16. The interface apparatus of claim 15 wherein the pointing device is taken from one of the group consisting of: a mouse, track ball, touch pad, light pen and PC styles.

17. The interface apparatus of claim 1 wherein the operator activities the various parts of the interface with a touch sensitive screen.

18. In a computer system, a method for manipulating objects and images comprising the steps of:

generating an actionable interface for a visual display with at least two annular control means: the first annular control means, when activated, generates a control signal of rotational motion which rotates a workpiece within a reference frame, the second annular control means, when activated, generates a control signal of translational motion which moves the workpiece within the reference frame;

moving a workpiece within the reference frame to a desired location in that reference frame, with the control signal of translational motion generated by activating the second annular control means;

rotating the workpiece within the reference frame to a desired angular orientation with the control signal of rotational motion generated by activating the first annular control means;

conducting at least one of the following imaging, analysis and comparison; and switching between two operating modes, a first mode for image acquisition and a second mode for image analysis, comparison and manipulation.

19. The method of claim 18 wherein the step of generating the interface further comprises the step of generating the first and second annular control means such that they are concentric and thus share a common center.

20. The method of claim 19 wherein the step of generating the interface further comprises: generating a third annular control means which shares the common center with the first and second annular control means and wherein activation of the third annular control means generates a signal of translational motion which moves the workpiece in large increments and the signal of translational motion generated by activation of the second annular control means moves the workpiece in small increments.

21. The method of claim 18 wherein generating the interface further comprises the step of the interface and the workpiece sharing a common reference frame.

22. The method of claim 18 wherein generation of a control signal by operator input at a selected spot on the second annular control means moves the workpiece in the direction of a vector pointing radially away from a center of the second annular control means and normal to a line tangent to a point on an outside circumference of the second annular control means which point is the closest point on the outside periphery to the selected spot.

23. The method of claim 18 wherein in the step of generating the interface comprises: segmenting the second annular control means into four equal arcs which share a common center, with each arc forming a separate button for directed motion, which on individual activation of each button generates a control signal for movement of the workpiece on a vector in a direction which is radially away from the common center of the arcs, said vector being normal to the center of the peripheral outside edge of the arc so activated, the arcs being so positioned that the direction of the vector of any one arc being perpendicular to the direction of the vectors of the two adjacent arcs and 180 degrees from the direction of the vector of the arc on the opposite of the common center.

24. The method of claim 23 wherein the step of generating the interface further comprises generating a third concentric annular control means which shares the common center with the second annular control means, the third annular control means being segmented into four equal arcs, each arc so formed by the third annular control means being paired with an arc of the second annular control means so that the paired arcs form two buttons for movement of the workpiece along a vector in the same direction, one of the arcs of each pair providing for small incremental movements of the workpiece and the other arc of each pair providing for large incremental movements of the workpiece.

25. The method of claim 24 wherein generating the interface further comprises generating two buttons at the common center of the annular control means, one of said buttons upon operator activation rotates the workpiece in a clockwise direction and the other button on operator activation rotates the workpiece in a counterclockwise direction.

26. The method of claim 18 wherein the step of operating in the first operating mode comprises manipulating with the interface a workpiece which is both an object and an image of that object, the image of the object so manipulated appearing on the visual display.

27. The method of claim 18 wherein the step of operating in the second operating mode comprises the workpiece being an image of a reference object and an image of a test object and simultaneously displaying on the visual display the image of the test object and the image of the reference object, and the further step of switching the interface in the second operating mode between three different states, a first state for manipulating the image of the test object, a second state for manipulating the image of the reference object and a third state for manipulating a combined image of the test object and the reference object.

28. The method of claim 18 wherein the step of operating in the first operating mode comprises the step of selecting one of two different states to operate in: a first state for acquisition of an image of a cartridge case and a second state for acquisition of images of the land engraved areas of a spent bullet.

29. The method of claim 28 wherein the step of operating in the second state includes the step of mapping to the first annular control means a representation of each land engraved area successfully imaged.

30. The method of claim 29 wherein, the step of the second state imaging the land engraved areas, further comprises the step of a third state mapping contours of the object imaged to the first annular control means.

31. The method of claim 29 comprising the step of entering the third state before entering the second state.

* * * * *